(12) United States Patent
Shikii et al.

(10) Patent No.: US 8,390,765 B2
(45) Date of Patent: Mar. 5, 2013

(54) LIQUID CRYSTAL DISPLAY APPARATUS

(75) Inventors: Shinichi Shikii, Nara (JP); Takayuki Nagata, Osaka (JP); Tatsuo Itoh, Osaka (JP); Kazuhisa Yamamoto, Osaka (JP); Shinichi Kadowaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 326 days.

(21) Appl. No.: 12/811,448

(22) PCT Filed: Nov. 2, 2009

(86) PCT No.: PCT/JP2009/005822
§ 371 (c)(1),
(2), (4) Date: Jul. 1, 2010

(87) PCT Pub. No.: WO2010/052886
PCT Pub. Date: May 14, 2010

(65) Prior Publication Data
US 2010/0289986 A1 Nov. 18, 2010

(30) Foreign Application Priority Data

Nov. 6, 2008 (JP) .................................. 2008-285119
Nov. 19, 2008 (JP) .................................. 2008-295208

(51) Int. Cl.
*G02F 1/1335* (2006.01)
(52) U.S. Cl. .......................................................... 349/65
(58) Field of Classification Search .................. None
See application file for complete search history.

(56) References Cited

U.S. PATENT DOCUMENTS 7,034,908 B2 * 4/2006 Liu .................. 349/95
8,009,251 B2 * 8/2011 Wu et al. .......... 349/95
(Continued)

FOREIGN PATENT DOCUMENTS

| JP | 9-80419 | 3/1997 |
|---|---|---|
| JP | 9-258207 | 10/1997 |
| JP | 2000-314877 | 11/2000 |
| JP | 2003-131228 | 5/2003 |
| JP | 2005-181831 | 7/2005 |
| JP | 2005-258404 | 9/2005 |

(Continued)

OTHER PUBLICATIONS

International Search Report issued Feb. 16, 2010 in corresponding International Application No. PCT/JP2009/005822.

*Primary Examiner* — Sung Pak
(74) *Attorney, Agent, or Firm* — Wenderoth, Lind & Ponack, L.L.P.

(57) ABSTRACT

A wavelength selection substrate 23 is configured with a wavelength selection section 23R which transmits only red laser light and reflects other light components, a wavelength selection section 23G which transmits only a green laser light and reflects other light components, and a wavelength selection section 23B which transmits only a blue laser light and reflects other light components. Of laser light 12 outputted from a light guide plate 14, a laser light component that corresponds to a color passing through one of the wavelength selection sections passes through the wavelength selection substrate 23 and enters a liquid crystal panel 22, whereas a laser light component that does not correspond to the color is reflected from the wavelength selection substrate 23 and returns the light guide plate 14. The laser light having returned the light guide plate 14 is reflected from the reflection plate 21 and again enters the wavelength selection substrate 23. This reciprocation of the laser light is repeated until the laser light pass through the wavelength selection section. With this repetition of passing and reflection, the laser light 12 is separated into respective colors of red, green, and blue, and outputted from the wavelength selection substrate 23.

29 Claims, 24 Drawing Sheets

U.S. PATENT DOCUMENTS

| | | | |
|---|---|---|---|
| 2003/0169385 A1* | 9/2003 | Okuwaki | 349/65 |
| 2003/0218701 A1* | 11/2003 | Kawakami | 349/65 |
| 2005/0231457 A1 | 10/2005 | Yamamoto et al. | |
| 2007/0013648 A1 | 1/2007 | Yamaguchi et al. | |
| 2009/0079908 A1* | 3/2009 | Miyazaki et al. | 349/65 |
| 2009/0190070 A1 | 7/2009 | Nagata et al. | |
| 2009/0284687 A1* | 11/2009 | Kirita et al. | 349/65 |
| 2010/0195022 A1* | 8/2010 | Shikii et al. | 349/65 |

FOREIGN PATENT DOCUMENTS

| | | |
|---|---|---|
| JP | 2006-12722 | 1/2006 |
| JP | 2006-331683 | 12/2006 |
| JP | 2007-25110 | 2/2007 |
| JP | 2008-66162 | 3/2008 |
| WO | 2007/015402 | 2/2007 |
| WO | 2008/013146 | 1/2008 |

* cited by examiner

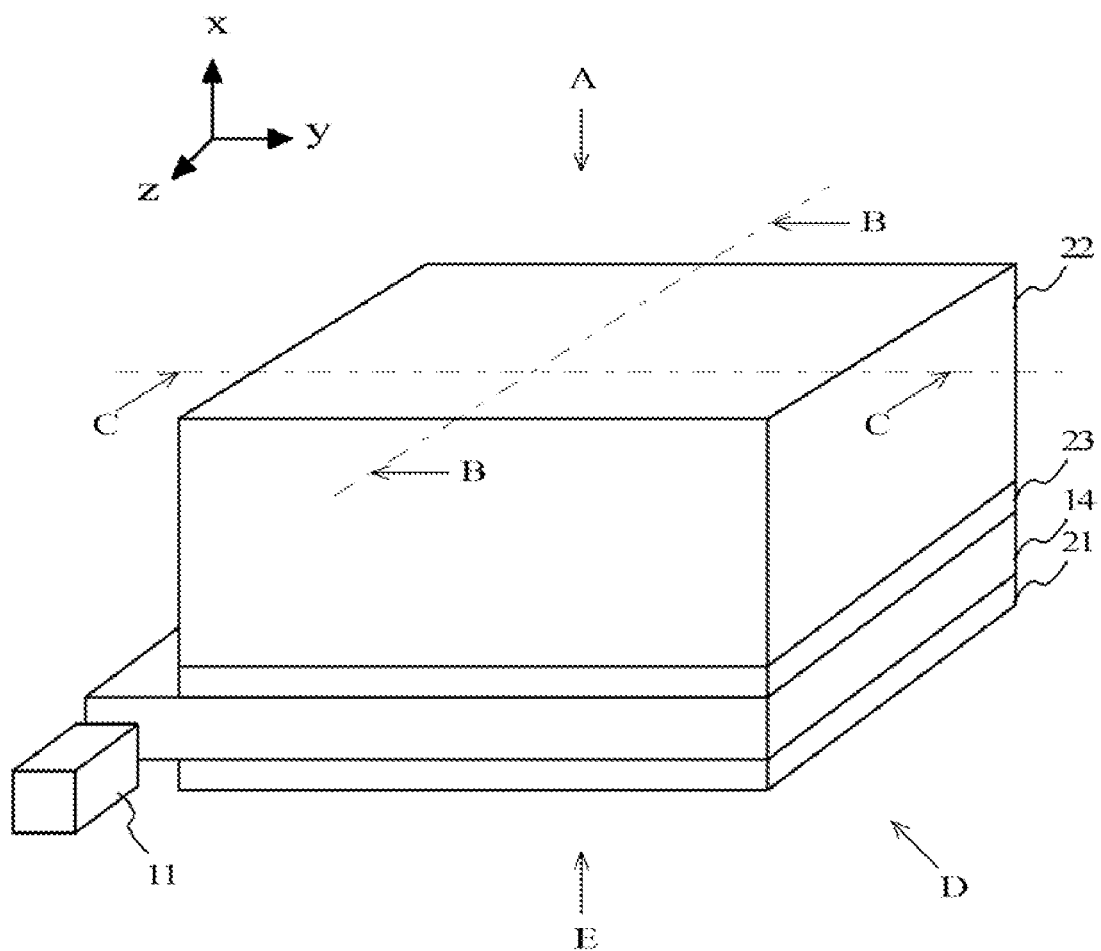

LIQUID CRYSTAL DISPLAY APPARATUS

TECHNICAL FIELD

The present invention relates to a liquid crystal display apparatus which realizes high efficiency and uniform brightness using a laser source as its light source.

BACKGROUND ART

Currently, a cold-cathode fluorescent lamp (hereinafter referred to as a CCFL) is widely used as a light source for a liquid crystal display apparatus. Generally known backlight methods using the CCFL are: an edge light method in which light from the CCFL enters a light guide plate from its side surface, and is outputted from a front surface of the light guide plate as substantially uniform planar light, so that the planar light illuminates a liquid crystal panel from its back surface; and a method of illumination directly from below, in which a plurality of CCFLs are arranged on a back surface of the liquid crystal panel to thereby directly illuminate the liquid crystal panel with the light of the CCFLs.

In recent years, from the viewpoint of the environmental issues or electrical power saving, image display devices are being developed which utilize, as light sources free from mercury and with lower power consumption, light sources formed of semiconductor materials such as a light emitting diode (LED) and a laser diode (LD). Particularly, the laser sources can be a light source most suitable for image display devices in terms of not only their low electric power consumption, but also image quality, for example, a wide color reproduction range. Moreover, the laser sources are advantageous from the viewpoint of downsizing and simplification of the light source in an image display device, since a light output of a W class can be achieved with a single laser source.

In addition, in order to configure a thin liquid crystal display apparatus, a light box or a light guide plate is generally applied. For example, as a liquid crystal backlight using the light guide plate, a liquid crystal display apparatus is proposed in Patent Document 1. In the liquid crystal display apparatus disclosed in Patent Document 1, LEDs are fixed at both ends of a light guide rod, and light from the LEDs are reflected by triangle grooves provided on a surface of the light guide rod on the side opposite to the light guide plate. The light is guided to the light guide plate, and is then reflected by a prism array formed on a reflection surface which opposes a light exiting surface of the light guide plate, thereby to improve the transmittance of light passing through a polarizing plate of a liquid crystal panel.

Further, proposed are liquid crystal backlights which realize illumination having a uniform light amount distribution and low power consumption, which are achieved with an improvement in the arrangement of laser sources and in optical systems (see Patent Documents 2 and 3).

Further, proposed is a technique in which laser light from a laser source is combined in a light guide plate by using at least two optical lenses, and the polarization direction of the laser light is adjusted with respect to the polarization direction of a light entering side of a liquid crystal panel (see Patent Document 4).

Further, proposed is a technique in which a red light component, a green light component, and a blue light component included in light emitted from a light source are separated in a light guide plate so as to be outputted, respectively, to red sub-pixels, blue sub-pixels, and green sub-pixels in a liquid crystal panel, whereby light elements absorbed by a color filter in the liquid crystal panel are reduced and high efficiency is achieved (see Patent Document 5).

CITATION LIST

Patent Literature

[PTL 1] Japanese Laid-Open Patent Publication No. 2003-131228
[PTL 2] Japanese Laid-Open Patent Publication No. 2006-331683
[PTL 3] International publication WO2007/015402 Pamphlet
[PTL 4] Japanese Laid-Open Patent Publication No. 2008-66162
[PTL 5] Japanese Laid-Open Patent Publication No. 2006-12722

SUMMARY OF INVENTION

Technical Problem

However, according to the above-described conventional techniques, the light outputted from the light guide plate is not still efficiently utilized when the light is provided to the liquid crystal panel. Particularly, light reflected from a liquid crystal panel and returning to a light guide plate is not to be re-utilized but to be wasted. Thus, the above conventional techniques have their limits in improvement of efficient light utilization.

Hence, an object of the present invention is to provide a liquid crystal display apparatus which effectively re-utilizes laser light reflected from a liquid crystal panel and returning to a light guide plate to thereby achieve uniform brightness highly efficiently and simply.

Solution to Problem

The present invention is directed to a liquid crystal display apparatus including a backlight employing an edge light method. In order to achieve the above object, the liquid crystal display apparatus of the present invention includes: a laser source unit which emits laser light having a plurality of different wavelengths; a light guide plate which receives the laser light from a side surface thereof, and outputs two-dimensional laser light having a predetermined spread angle from an upper surface thereof perpendicular to the side surface, a liquid crystal panel having thereinside color filters corresponding to the plurality of wavelengths; a wavelength selection substrate including wavelength selection sections which are arranged, for the respective wavelengths, between the liquid crystal panel and the upper surface of the light guide plate in a manner as to correspond to an arrangement of the color filters, and which each transmit a predetermined wavelength of laser light and reflect laser light having wavelengths other than the predetermined wavelength; and a reflector which is arranged on the side of a bottom surface, which opposes the upper surface of the light guide plate, and reflects laser light having reflected from the wavelength selection substrate and passed through the light guide plate to thereby cause the laser light to re-enter the wavelength selection substrate through the light guide plate. The predetermined spread angle is set relative to a plane parallel with an arrangement direction of the wavelength selection sections and/or relative to a plane orthogonal to the arrangement direction. Further, the wavelength selection substrates may be arranged inside the liquid crystal panel, and in this case, the color filters are not necessary.

In the wavelength selection substrate, a width and a length of each wavelength selection section are shorter than a width and a length of each color filter, and reflecting portions may be arranged at boundaries between the wavelength selection sections adjoining one another, the reflecting portions each reflecting more than or equal to 50% of all wavelengths of laser light emitted from the laser source unit. Each of the reflecting portions is typically formed of a metal thin film or a dielectric multilayer film. Note that each reflecting portion may be arranged in a manner as to partially overlap on adjoining two of the wavelength selection sections.

In the wavelength selection substrate, the arrangement of the wavelength selection sections may be displaced from the arrangement of the color filters in accordance with an angle θ that is formed between an axis perpendicular to an arrangement direction of the wavelength selection sections and an optical axis of principal laser light entering the wavelength selection sections, and with a distance between the color filters and the wavelength selection substrate. The angle θ is set to a value satisfying a formula below, where used are a pitch Pg in an arrangement direction of the wavelength selection sections, a distance Hg between the wavelength selection substrate and the reflector, and a spread angle α of laser light outputted from the light guide plate to the wavelength selection substrate, the spread angle α being relative to a plane orthogonal to the arrangement direction of the wavelength selection sections, $$10 \geq \theta \geq \sin^{-1}(Pg/(10 \times Hg \times \tan \alpha)).$$

The light guide plate has, on at least a part of the bottom surface, a reflecting portion which turns a traveling direction of laser light having entered from the side surface toward the direction of the upper surface, and in the reflecting portion, any of triangular prisms, trapezoidal prisms, and prisms having curved surfaces are formed in a sloped manner, and a range that is irradiated with the entering laser light in each prism is preferably set to range from 1 μm to 20 μm in a direction parallel with the upper surface of the light guide plate. Note that the reflector may be a total reflection prism arranged on the bottom surface of the light guide plate.

A vibrating section may be further included which causes laser light emitted from the laser source unit to vibrate at least either in a widthwise direction or in a thickness direction of the light guide plate. The vibrating section may further include a control section which adjusts a quantity of light of laser light emitted from the laser source unit, for a plurality of wavelengths thereof individually, in accordance with a brightness distribution in the light guide plate or image data to be displayed on the liquid crystal panel. Further, the control section adjusts individually a quantity of light of laser light emitted from the laser source unit, depending on positions, in the light guide plate, where the laser light emitted from the laser source unit enters, or in accordance with a one-dimensional or two-dimensional brightness distribution of respective wavelengths of laser light outputted from the light guide plate when laser light having a predefined quantity of light is emitted from the laser source unit to the light guide plate.

The laser source unit may generate laser light in a single transverse mode in a predetermined direction, and emit parallel light to the side surface of the light guide plate, the parallel light being obtained by converting the laser light so as to be substantially parallel with the predetermined direction. The laser source unit may include a semiconductor laser source which generates laser light in a single transverse mode in a thickness direction of an active layer.

Advantageous Effects of Invention

According to the present invention, it is possible to cause respective color laser light rays, which have been obtained with less absorption loss by wavelength separation in the wavelength selection substrate, to enter respective color filters as they are. Accordingly, a liquid crystal display apparatus which can achieve uniform brightness and high light utilization efficiency regardless of fluctuation in temperature can be configured easily without modification of the liquid crystal panel.

BRIEF DESCRIPTION OF DRAWINGS

FIG. 1 is a diagram schematically illustrating an outline structure common to liquid crystal display apparatuses described in respective embodiments of the present invention.

DESCRIPTION OF EMBODIMENTS

Figure 2A:
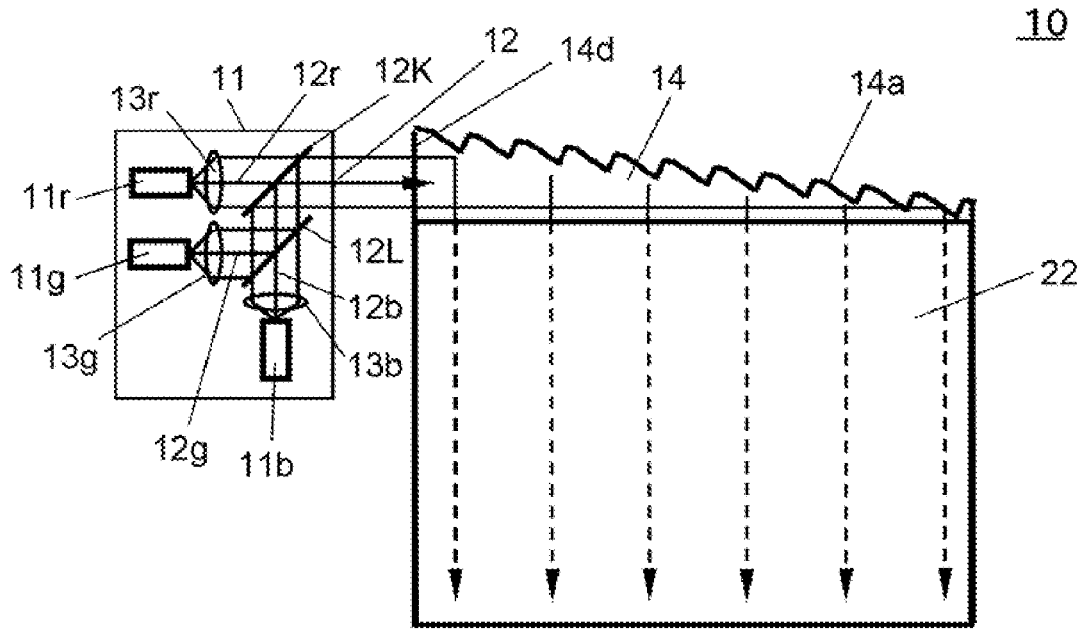
FIG. 2A is an arrow view illustrating a configuration of a liquid crystal display apparatus 10 according to a first embodiment of the present invention.

FIG. 1 is a diagram schematically illustrating an outline structure common to liquid crystal display apparatuses described in respective embodiments of the present invention. In FIG. 1, a liquid crystal display apparatus of the present invention includes a laser source unit 11, a light guide plate 14, a reflection plate 21, a wavelength selection substrate 23, and a liquid crystal panel 22. Laser light emitted from the laser source unit 11 enters the light guide plate 14. The entered laser light spreads over the entirety of the light guide plate 14, and is provided to the liquid crystal panel 22 by means of the reflection plate 21 and the wavelength selection substrate 23.

Hereinafter, description will be made sequentially on various embodiments of the liquid crystal display apparatus of the present invention.

First Embodiment

Figure 2B:
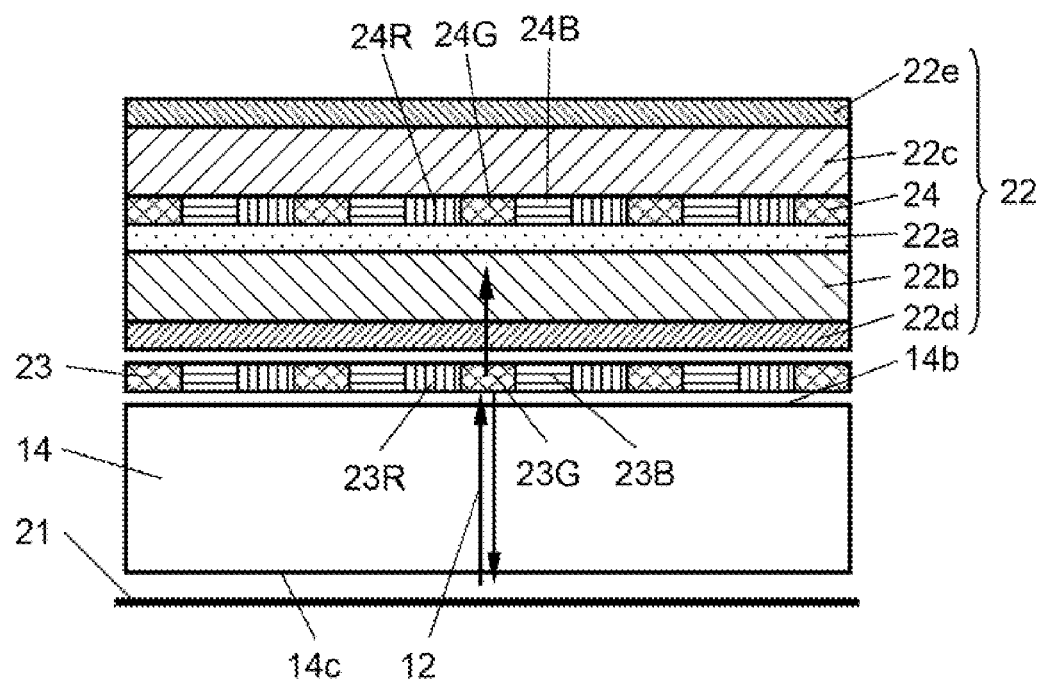
FIG. 2B is a cross-sectional view illustrating a configuration of the liquid crystal display apparatus 10 according to the first embodiment of the present invention.
Figure 2C:
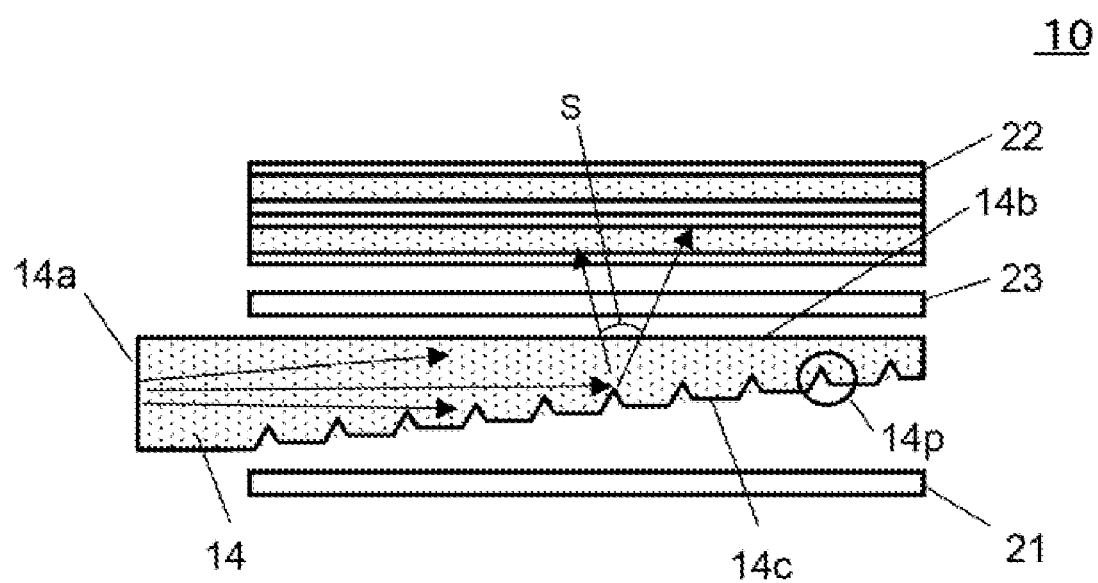
FIG. 2C is a cross-sectional view illustrating a configuration of the liquid crystal display apparatus 10 according to the first embodiment of the present invention.

FIGS. 2A to 2C are each a diagram illustrating a configuration of a liquid crystal display apparatus 10 according to a first embodiment of the present invention. FIG. 2A is an arrow view as viewed from a point A in FIG. 1; FIG. 2B is a vertical sectional view along an XZ plane cut along a B-B line shown in FIG. 1; and FIG. 2C is a vertical sectional view along an XY plane cut along a C-C line in FIG. 1. FIG. 2A illustrates the liquid crystal panel 22 in a transparent manner so that laser light 12 (dotted arrows) propagating over the light guide plate 14 is viewed.

In FIG. 2A, the laser source unit 11 includes a red laser source 11r, a green laser source 11g, a blue laser source 11b, collimator lenses 13r, 13g, and 13b, dichroic mirrors 12K and 12L. The red laser source 11r outputs a red laser light beam, the green laser source 11g outputs a green laser light beam, and the blue laser source 11b outputs a blue laser light beam. The color laser light beams outputted from the respective light sources are converted into substantially parallel light beams 12r, 12g, and 12b by the collimator lenses 13r, 13g, and 13b. The color laser light beams having been converted into the substantially parallel light beams 12r, 12g, and 12b are combined by means of the dichroic mirrors 12K and 12L into laser light 12 to thereby be outputted.

The light guide plate 14 is a rectangular parallelepiped having a sloping first side surface 14a and a sloping bottom surface 14c, and the sloping surfaces have reflecting portions. The laser light 12 emitted from the laser source unit 11 enters the light guide plate 14 from a second side surface 14d adjoining the first side surface 14a, hits the sloping reflecting portion of the first side surface 14a, where the propagation direction of the laser light 12 is angled 90 degrees, and the laser light 12 turns into linear light (FIG. 2A). The linear light hits the sloping reflecting portion of the bottom surface 14c, where the propagation direction of the linear light is angled 90 degrees, and the linear light turns into planar light to thereby be outputted from an upper surface 14b on which a wavelength selection substrate 23 is located (FIG. 2C).

As shown in FIG. 2A, for example, since the reflecting portion having a plurality of triangular prisms arranged at a predetermined pitch is formed on the sloping first side surface 14a, total reflection is caused, and thereby the propagation direction of the laser light 12 can be angled 90 degrees highly efficiently. Similarly, as shown in FIG. 2C, for example, since the reflecting portion having erecting prisms 14p arranged at a predetermined pitch is formed on the sloping bottom surface 14c, total reflection is caused, and thereby uniform planar light without optical losses can be created. The laser light 12 reflected by the erecting prisms 14p has a predetermined spread angle S relative to a thickness direction (hereinafter referred to as the XY plane) of the light guide plate 14, the direction including a laser light traveling direction before its reflection. The spread angle S of the laser light will be described later.

The planar laser light 12 outputted from the upper surface 14b of the light guide plate 14 enters the wavelength selection substrate 23. The wavelength selection substrate 23 includes a wavelength selection section 23R which has a function of transmitting a red laser light component only and reflecting other laser light components, a wavelength selection section 23G which has a function of transmitting a green laser light component only and reflecting other laser light components, and a wavelength selection section 23B which has a function of transmitting a blue laser light component only and reflecting other laser light components.

In FIG. 2B, laser light components corresponding to colors transmittable by the respective wavelength selection sections 23R, 23G and 23B pass through the wavelength selection substrate 23 and enter the liquid crystal panel 22. On the other hand, laser light components not corresponding to colors transmittable by the respective wavelength selection sections 23R, 23G, and 23B are reflected from the wavelength selection substrate 23, and enter again the light guide plate 14. The laser light components having entered again the light guide plate 14 due to no color correspondence are reflected by the reflection plate 21, and enter again the wavelength selection substrate 23. If the colors of the laser light components, which again reach the respective wavelength selection sections 23R, 23G, and 23B, correspond to the colors transmittable by the respective wavelength selection sections 23R, 23G, and 23B, then the laser light components pass through the wavelength selection substrate 23, and enter the liquid crystal panel 22. If not, the laser light components are returned to the light guide plate 14, and the same movement is repeated. These passing and reflection are performed repeatedly, and the laser light 12 composed of synthesis of three primary colors is finally divided into a red color, a green color, and a blue color, which are outputted from the wavelength selection substrate 23.

The liquid crystal panel 22 includes a liquid crystal layer 22a, a color filter array 24, a lower-side glass plate 22b, an upper-side glass plate 22c, a lower-side polarizing plate 22d, and an upper-side polarizing plate 22e. The color filter array 24 includes a red color filter 24R, a green color filter 24G and a blue color filter 24B. The arrangement of the respective color filters 24R, 24G and 24B and the position of the same filters in a vertical direction correspond to those of the respective wavelength selection sections 23R, 23G and 23B of the wavelength selection substrate 23 (FIG. 2B).

With the above structure, the liquid crystal display apparatus 10 of the present invention allows the respective color laser light components, which have been obtained with less absorption loss by wavelength separation in the wavelength selection substrate 23, to enter the color filter array 24 as they are. Accordingly, regardless of temperature fluctuation, it is possible to configure a liquid crystal display apparatus which constantly exhibits a high light utilization efficiency. Hereinafter, specific examples of respective components will be described.

Figure 3A:
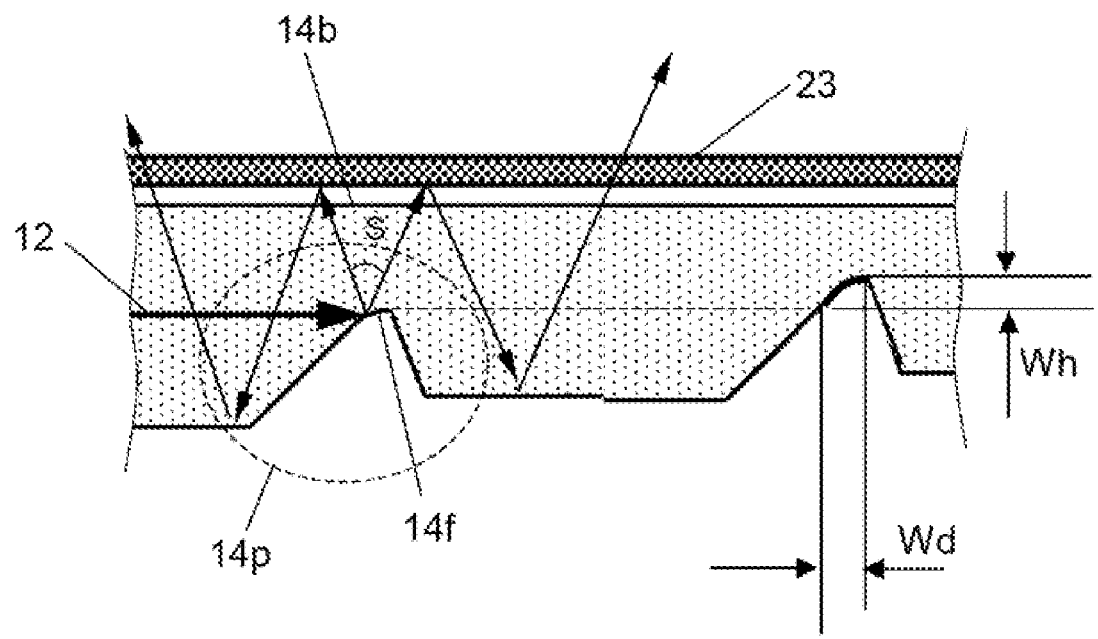
FIG. 3A is a diagram illustrating an example of a shape of an erecting prism 14p formed on a bottom surface 14c of a light guide plate 14.
Figure 3B:
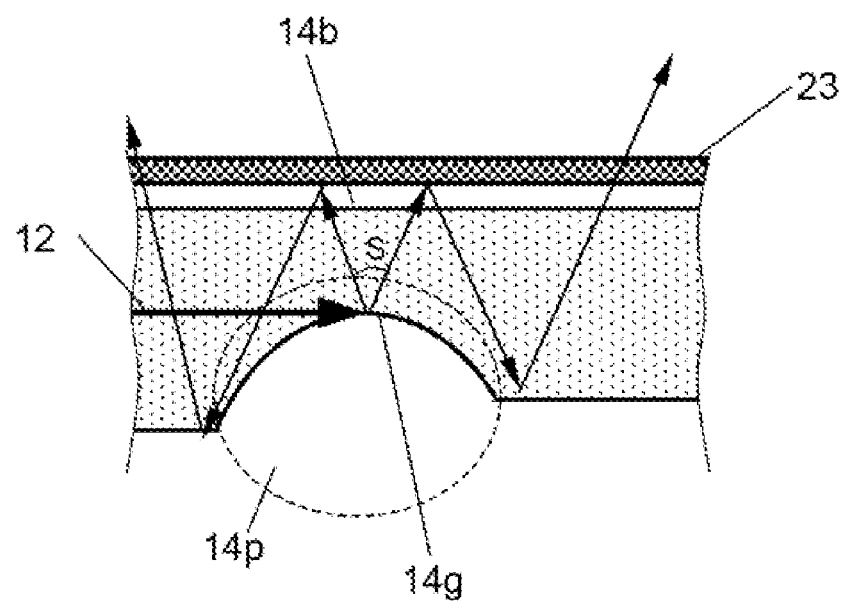
FIG. 3B is a diagram illustrating an example of a shape of an erecting prism Hp formed on the bottom surface 14c of the light guide plate 14.

FIGS. 3A and 3B are each a diagram illustrating an example of a shape of an erecting prism 14p formed on a bottom surface 14c of a light guide plate 14. FIG. 3A is an example of the erecting prism 14p which is a triangular prism partially having a curved surface 14f, whereas FIG. 3B is an example of the erecting prism 14p which is generally formed of a curved surface 14g. When the erecting prism 14p is configured in the shape shown in FIGS. 3A and 3B, it is possible to output laser light 12 having a predetermined spread angle S to the wavelength selection substrate 23.

Particularly, in the XY plane, when a range on the erecting prism 14p where the laser light enters, that is, a width Wd of the erecting prism 14p, is set to 20 μm or lower, the spread angle S of the laser light which has been turned upwardly by the erecting prism 14p can be increased. This is because when the width causing reflection is narrowed, light diffraction occurs. For example, in the case of a red laser light component, when the width Wd is 20 μm, a spread angle S of ±1.2 degrees can be achieved. Note that when the width Wd is decreased from 20 μm, the spread angle S can be increased. However, the width Wd is preferably 1 μm or more, since a width as narrow as about a light wavelength leads to diffraction limits. Further, in FIG. 3B, a width of the curved surface 14g is adjusted, whereby it is possible to cause the laser light to have a predetermined spread angle relative to a widthwise direction (hereinafter referred to as the XZ plane) of the light guide plate 14, the direction including a laser light traveling direction before its reflection, as well as relative to the XY plane.

The method for causing the laser light 12 entering the wavelength selection substrate 23 to have a spread angle S is not limited to the light reflection utilizing the erecting prisms 14p having the above-described curved surfaces. For example, it may be set such that the laser light 12 already having a predetermined spread angle relative to the XY plane is emitted to the light guide plate 14. Since the laser light 12 travels on the XY plane while being subject to total reflection, an angular distribution of the laser light 12 when it has entered the light guide plate 14 is retained. Thus, if the erecting prism 14p is configured with a triangular prism or a trapezoidal prism, the laser light 12 entering while having a spread angle will be reflect toward the wavelength selection substrate 23 while keeping the spread angle.

In this manner, if the laser light to enter the wavelength selection substrate 23 has a predetermined spread angle S prior to entering, it is possible to reduce the occurrence of laser light that is reflected from the wavelength selection substrate 23 due to no color correspondence. Further, in this case, since the laser light components which are reflected by adjoining erecting prisms 14p are overlapped with each other, a predetermined degree of brightness can be maintained advantageously.

The thickness of the light guide plate 14 can be reduced along with the wavelength selection substrate 23. That is, in the case where the laser light propagating in a Y direction on the XY plane is subject to total reflection by the erecting prisms 14p, and is outputted toward the X-axis direction from the upper surface 14b, the spread angle S satisfying the condition for the total reflection by the erecting prisms 14p is about 6 degrees or lower. Under a condition where the wavelength selection substrate 23 is interposed between the upper surface 14b and the liquid crystal panel 22, if the erecting prisms 14p are arranged at a pitch of about 1 mm, it is possible to achieve uniform illumination (the refractive index of the light guide plate 14 is 1.49, and the distance between the light guide plate 14 and the wavelength selection substrate 23 is 10 mm). On the other hand, without the wavelength selection substrate 23, it is not possible to achieve uniform illumination unless the erecting prisms 14p are arranged at a pitch of about 0.5 mm. This is because use of the wavelength selection substrate 23 causes multiple reflections between the wavelength selection substrate 23 and the reflection plate 21, and thereby the laser light 12 reflected from the erecting prism 14p reaches the wavelength selection substrate 23 extensively. In this manner, use of the wavelength selection substrate 23 enables a decrease of the number n of the pieces of the erecting prisms 14p. That is, it is possible to reduce the thickness of the light guide plate 14 (=Width Wh×n of FIG. 3A).

Figure 4A:
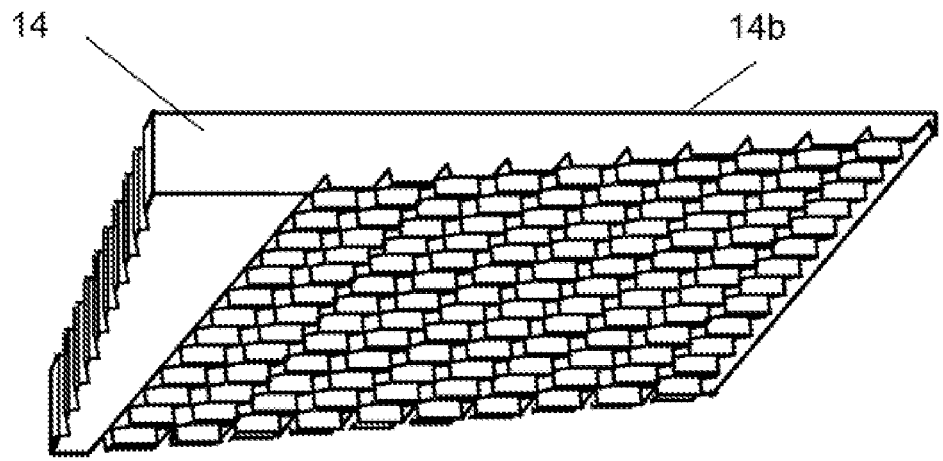
FIG. 4A is a diagram illustrating a configurational example of the light guide plate 14 equipped with a reflection plate 21.
Figure 4B:
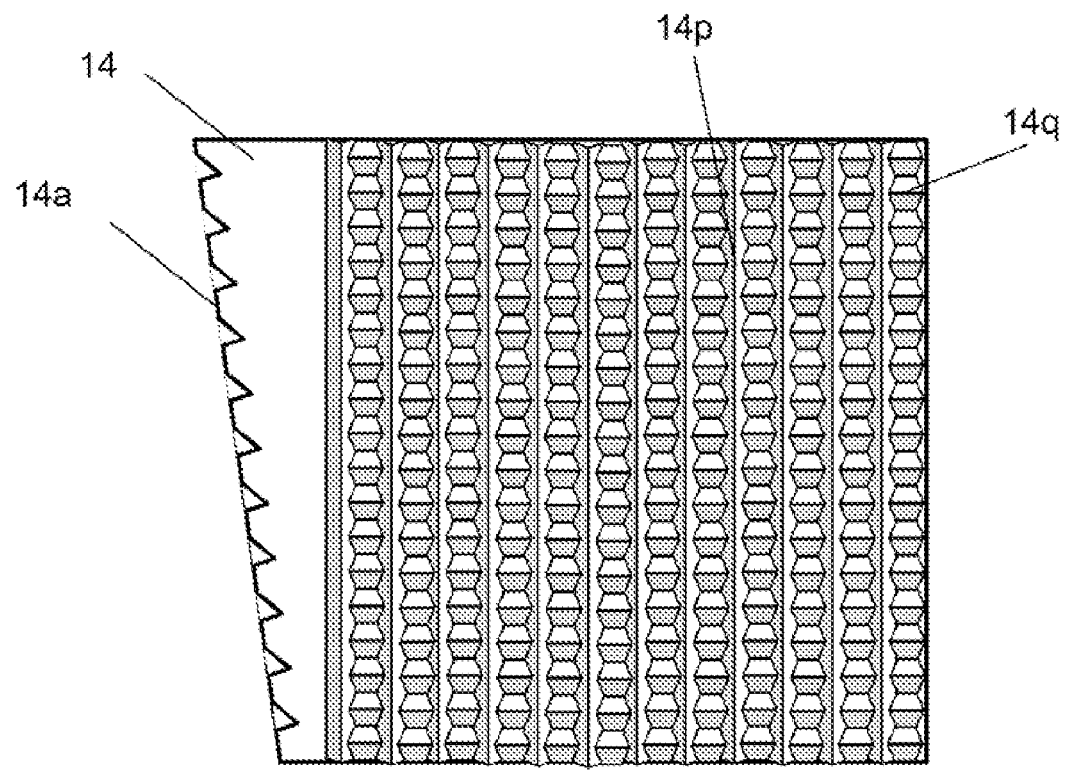
FIG. 4B is a diagram illustrating a configurational example of the light guide plate 14 equipped with a reflection plate 21.
Figure 4C:
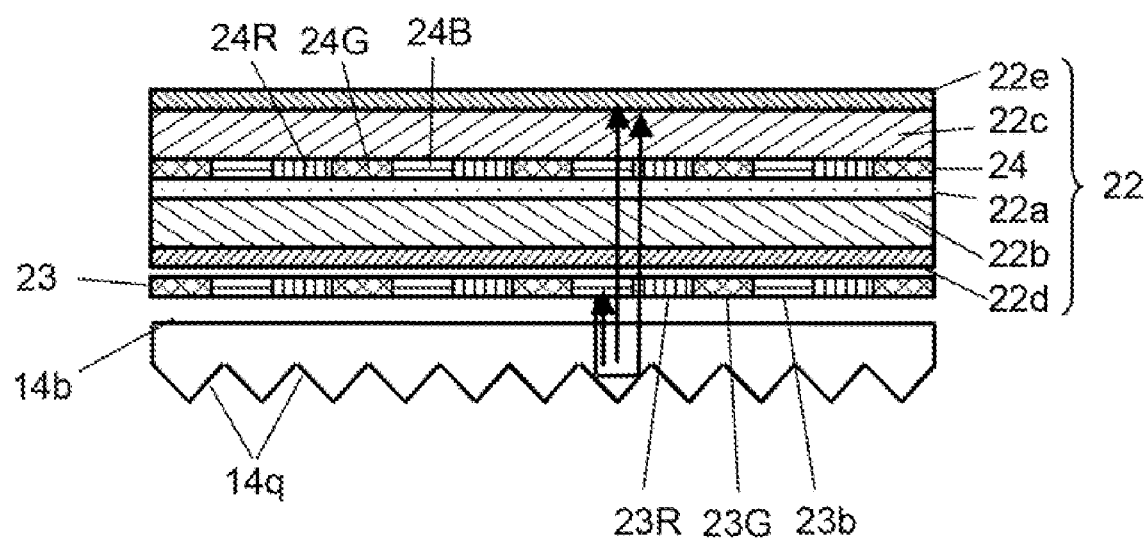
FIG. 4C is a diagram illustrating a configurational example of the light guide plate 14 equipped with a reflection plate 21.

The structure described in the above example is such that the light guide plate 14 and the reflection plate 21 are independent of each other. However, the reflection plate 21 may be integrated with the light guide plate 14. FIGS. 4A to 4C are each a diagram illustrating a configurational example of the light guide plate 14 including the reflection plate 21. FIG. 4A is an arrow view as viewed from a point D in FIG. 1; FIG. 4B is an arrow view as viewed from a point E in FIG. 1; and FIG. 4C is a vertical sectional view of the XZ plane cut along the B-B line in FIG. 1.

The light guide plate 14 in FIG. 4A has triangular prisms arranged on the first side surface 14a, as shown in FIG. 2A, and also has erecting prisms 14p arranged on the upper surface 14b at predetermined intervals, as shown in FIG. 2C. The erecting prisms 14p are configured with triangular prisms or trapezoidal prisms, for example. In addition, on the bottom surface 14c, total reflection prisms 14q, which function in place of the reflection plate 21, are arranged between respective adjoining erecting prisms 14p such that their reflection surfaces are orthogonal to the erecting prisms 14p. When the light guide plate 14 of this type is used, as shown in FIG. 4C, a laser light component which is to enter again the light guide plate 14 due to no color correspondence enters a wavelength selection section that is different from that the laser light component had initially entered since the total reflection is caused twice due to the total reflection prisms 14q, whereby the laser light component passes through the wavelength selection section with a high possibility. Since the total reflection prisms 14q totally reflect the laser light, no reflection loss occurs, leading to high light utilization efficiency.

FIGS. 5A to 5D are each a diagram illustrating a structural example of the wavelength selection substrate 23.

Figure 5A:
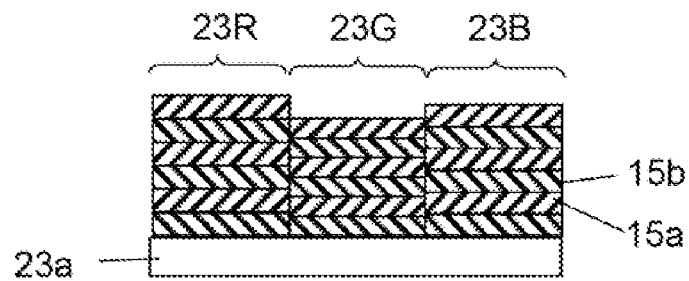
FIG. 5A is a diagram illustrating a structural example of a wavelength selection substrate 23.
Figure 5B:
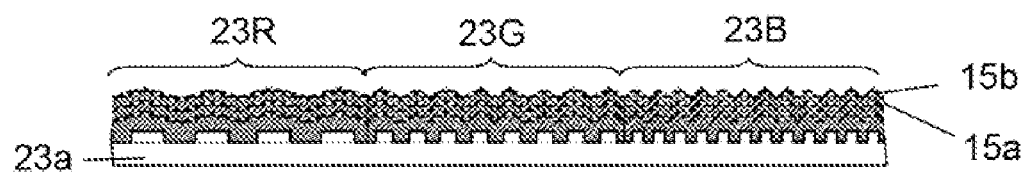
FIG. 5B is a diagram illustrating a structural example of the wavelength selection substrate 23.
Figure 5C:
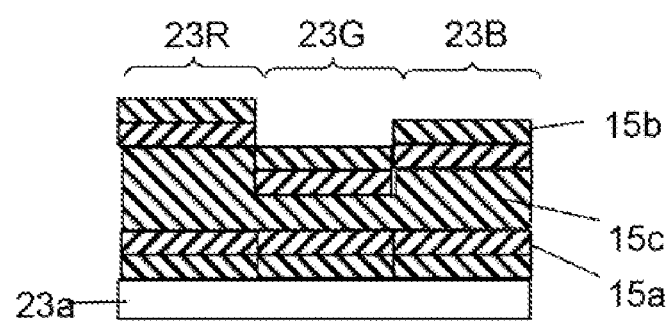
FIG. 5C is a diagram illustrating a structural example of the wavelength selection substrate 23.
Figure 5D:
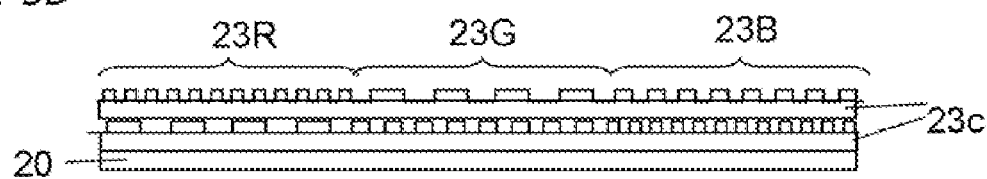
FIG. 5D is a diagram illustrating a structural example of the wavelength selection substrate 23.

FIG. 5A illustrates an example of formation of the respective wavelength selection sections 23R, 23G, and 23B, where coating films which differ in thickness are formed, by vapor deposition or application, on the surface of the substrate 23a made of glass, resin, or the like. The coating is performed by accumulating a plurality of high-refractive index films 15a and a plurality of low-refractive index films 15b, which both are dielectric multi-layer films, one by one, alternately. Generally, $TiO_2$ (having a refractive index of 2.4) or $Nb_2O_5$ (having a refractive index of 2.33), for example, is used for the high-refractive index film 15a, whereas $SiO_2$ (having a refractive index of 1.4), for example, is used for the low-refractive index film 15b. FIG. 5B shows an example, where surface grids having different pitches are arranged on the surface of the substrate 23a, and the high-refractive index films 15a and the low-refractive index films 15b are respectively vapor deposited uniformly on the surface grids, whereby the wavelength selection sections 23R, 23G and 23B are formed. According to this method, the thickness of the coating films to be vapor deposited is constant for the respective wavelength selection sections 23R, 23G and 23B, and thus this method is convenient for the case of performing a vapor deposition on a relatively wide area. FIG. 5C shows an example where coating films having a uniform thickness are formed, by vapor deposition or application, on the surface of the substrate 23a, and the respective wavelength selection sections 23R, 23G and 23B are formed by interposing a spacer layer 15c between the layers of the coating films depending on the respective wavelength selection sections 23R, 23G and 23B (e.g., single layer etching). FIG. 5D shows an example, where two grid patterns 23c of different sub wavelength orders are accumulated on the substrate 23a, to thereby form the respective wavelength selection sections 23R, 23G and 23B. In this case, the grid patterns can be arranged by transfer with a mold. Accordingly, this method saves time and efforts required for vapor deposition or the like in particular, and is convenient for processing of a wide area at one time.

Figure 6A:
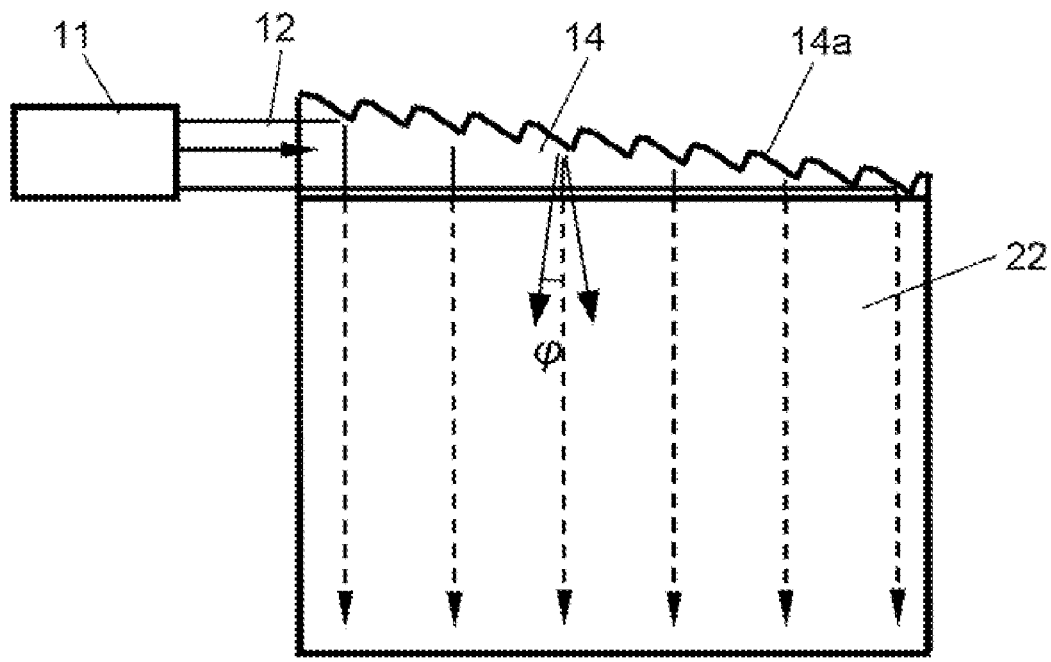
FIG. 6A is an arrow view illustrating a configuration of the liquid crystal display apparatus 10 according to the first embodiment of the present invention.

Note that, the description herein so far is based on the assumption that the laser light 12 does not have a spread angle relative to the XZ plane. However, there may be a case where the laser light 12 emitted from the laser source unit 11 is spread, or a case where the laser light 12 is reflected from the first side surface 14a of the light guide plate 14 with a predetermined spread angle φ (see FIG. 6A). In the case of using the laser light 12 having such a spread angle φ, it is preferable to configure the wavelength selection substrate 23 and the liquid crystal panel 22 as follows. Note that FIG. 6A illustrates the liquid crystal panel 22 in a transparent manner so that the laser light 12 (dotted arrows) propagating over the light guide plate 14 is viewed.

Figure 6B:
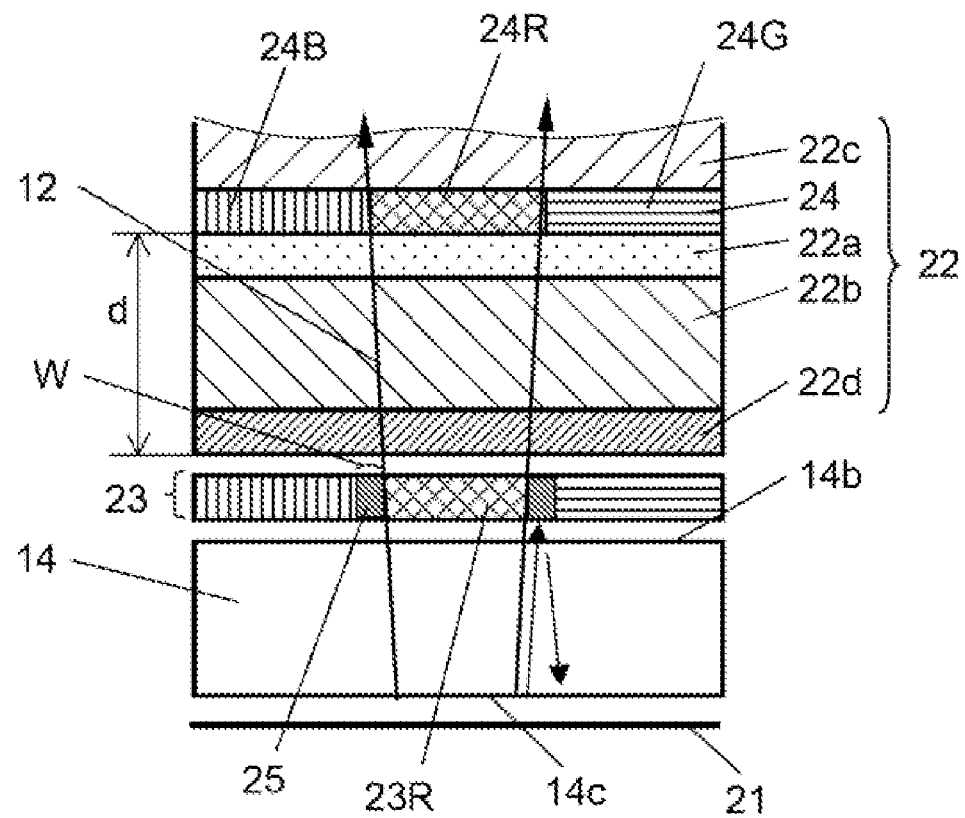
FIG. 6B is a diagram illustrating a structural example of the wavelength selection substrate 23.

The laser light 12 entering the light guide plate 14 while having a spread angle φ is subject to total reflection due to the erecting prisms 14p, and reaches the wavelength selection substrate 23 while each keeping the spread angle φ, as shown in FIG. 6B. In this case, the width of the wavelength selection sections 23R, 23G; and 23B is set narrower than that of the color filters 24R, 24G and 24B, and reflecting portions 25 are arranged at boundaries of the respective wavelength selection sections so as to reflect all wavelengths of the laser light 12. The width W of each reflecting portion 25 is obtained from the following formula using the spread angle φ of the laser light 12 and the distance d between the wavelength selection substrate 23 and the color filter array 24.

$$W \geq 2d \times \tan\phi$$

With the reflecting portions 25, even if the laser light entering the wavelength selection substrate 23 has a spread angle φ, it is possible to prevent a laser light component of a certain color having passed through the wavelength selection substrate 23 from entering an adjoining color filter for another color. Therefore, absorption loss by different color filters can be removed, and the light utilization efficiency can be improved. The reflecting portions 25 are each formed of a metal thin film (e.g., aluminum, silver), a dielectric multilayer film, or the like, and preferably have a reflectance of 50% or more with respect to the respective color wavelengths.

Figure 7A:
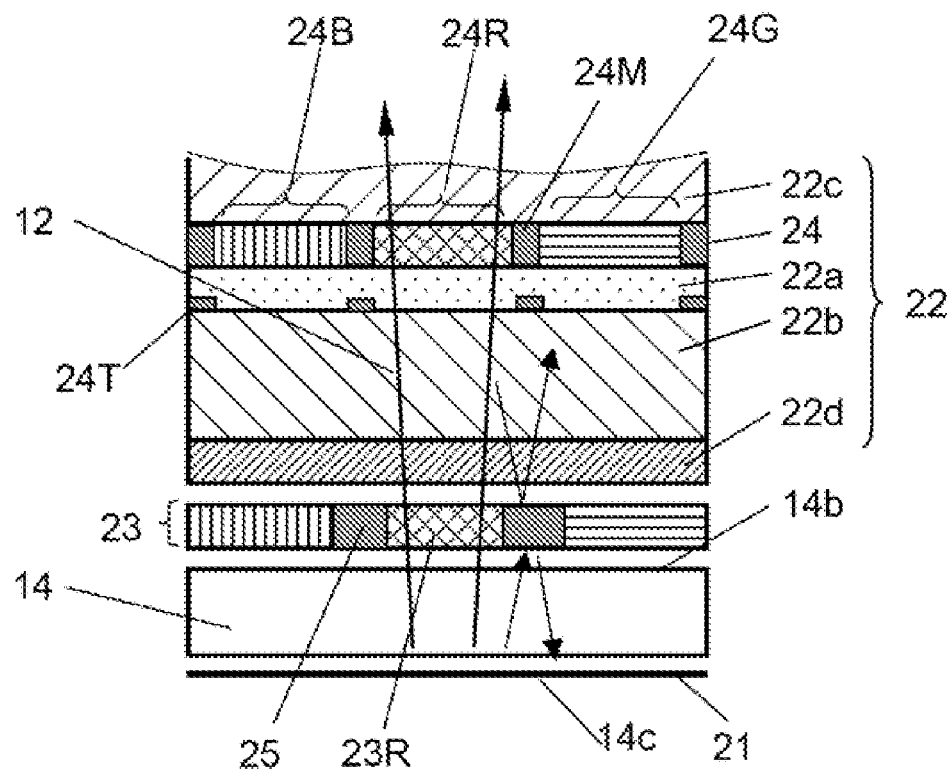
FIG. 7A is a diagram illustrating a structural example of the wavelength selection substrate 23.
Figure 7B:
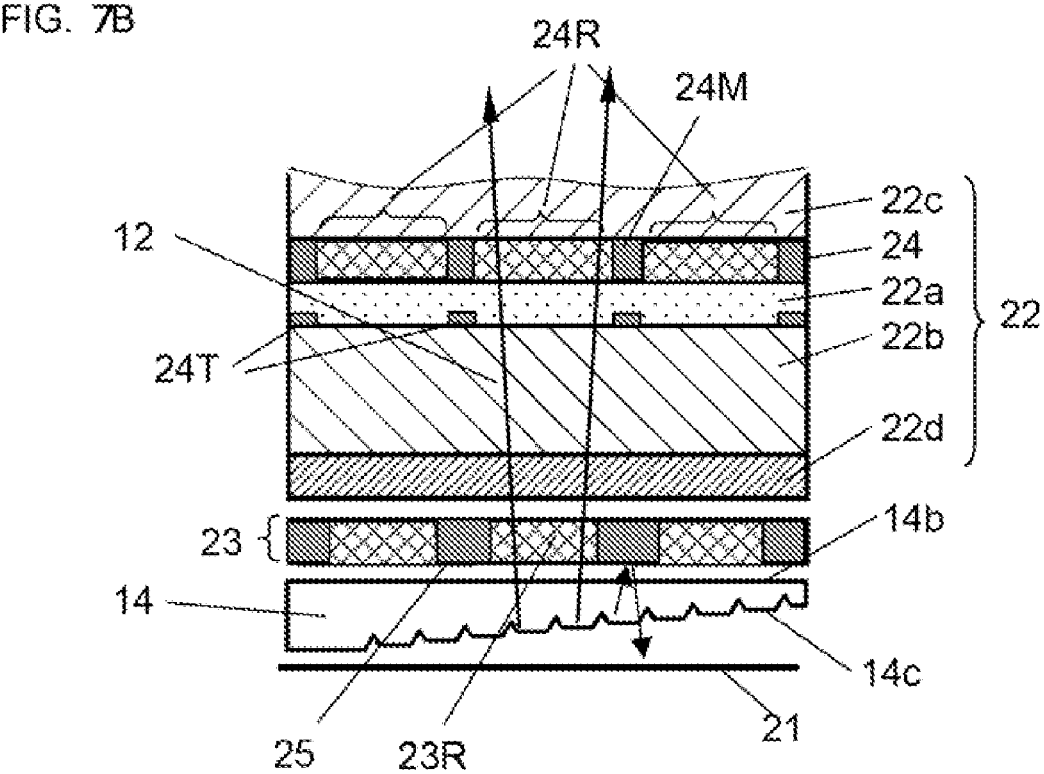
FIG. 7B is a diagram illustrating a structural example of the wavelength selection substrate 23.

Further, as shown in FIG. 7A, a similar effect can be obtained in a case where black matrices 24M are arranged at the boundaries of the color filters 24R, 24G and 24B, or in a case where TFTs or wiring portions 24T are arranged within the liquid crystal layer 22a. That is, if the width of the wavelength selection sections 23R, 23G and 23B is set narrower than that of the color filters 24R, 24G, and 24B, and the reflecting portions 25 are arranged at the boundaries of the respective wavelength selection sections so as to reflect all wavelengths of the laser light 12, then the light utilization efficiency can be improved. The above configuration can be applied to not only color filters adjoining one another in a screen horizontal direction, but also pixels adjoining one another in a screen vertical direction. That is, the length (pixel unit) of each of the wavelength selection sections 23R, 23G and 23B is set narrower than the length (pixel unit) of each of the color filters 24R, 24G and 24B, and the reflecting portions 25 are arranged at the boundaries of pixels of each of the respective wavelength selection sections so as to reflect all the wavelengths of the laser light 12 (FIG. 7B).

Figure 8A:
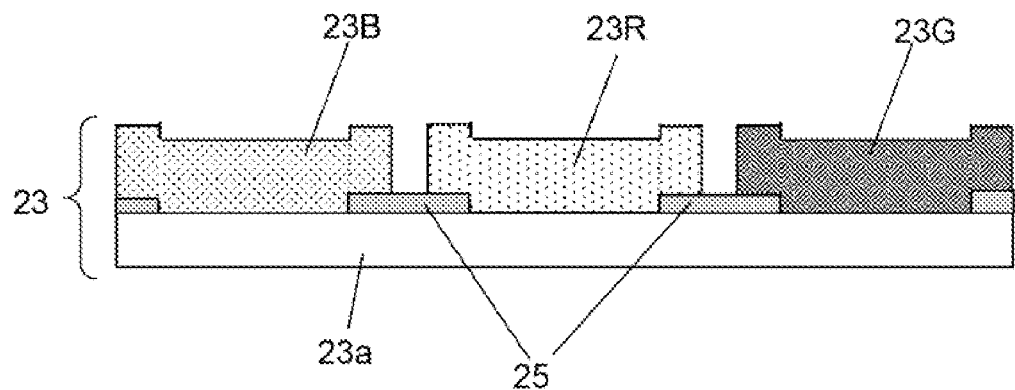
FIG. 8A is a diagram illustrating a structural example of the wavelength selection substrate 23.
Figure 8B:
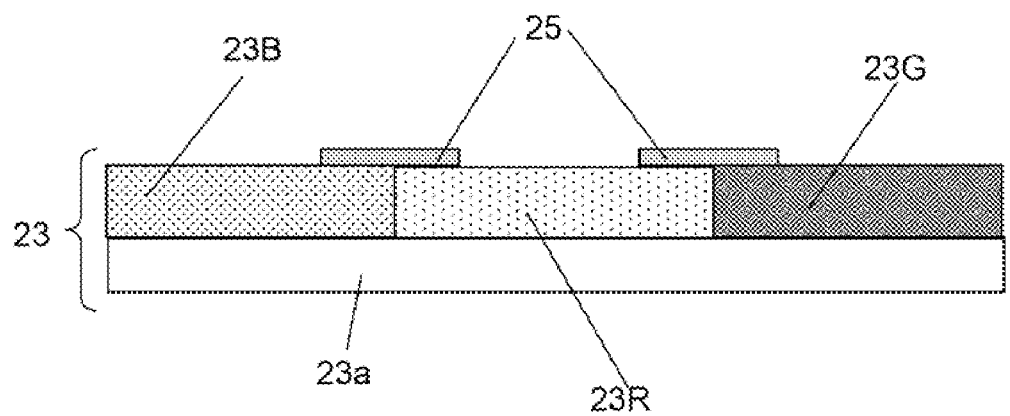
FIG. 8B is a diagram illustrating a structural example of the wavelength selection substrate 23.
Figure 8C:
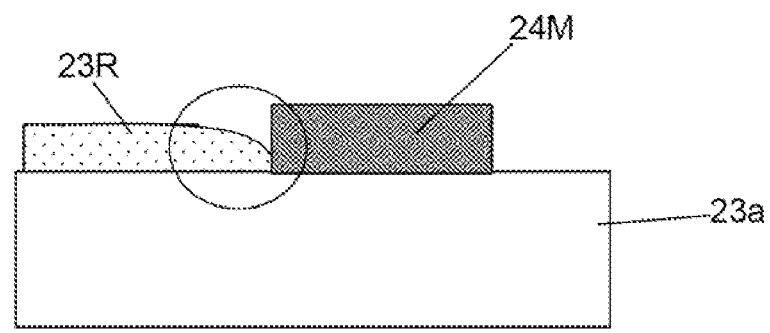
FIG. 8C is a diagram illustrating a structural example of the wavelength selection substrate 23.

Note that in addition to being arranged so as to be interposed between adjoining wavelength selection sections, the reflecting portions 25 may be arranged as shown in FIGS. 8A to 8C. FIG. 8A is an example where the wavelength selection sections are arranged in a manner as to be partially overlapped on the reflecting portions 25. FIG. 8B is an example where the reflecting portions 25 are arranged in a manner as to be overlapped on the boundaries of the respective wavelength selection sections.

For example, when each of the wavelength selection sections is formed of a dielectric multilayer film, there may be a case where characteristics of each wavelength selection section are deteriorated at their ends due to "film sagging in the thickness direction" caused at the time of film formation. The "film sagging in the thickness direction" means that the thickness of a film having been subject to vapor deposition becomes thinner than the original thickness at an area (the circled part of FIG. 8C) close to an end of a mask 24M due to the effect of vapor deposition direction at the time of film formation or the like. In such an area, desired characteristics cannot be attained. In such a case, there may cause a case where light having wavelengths that usually do not pass through the wavelength selection section, pass through the end of the wavelength selection section, resulting in an increase in loss. Further, in the case of film formation by arranging the reflecting portions and wavelength selection sections in a manner as to adjoin one another, it is difficult to achieve positional accuracy of ends of the wavelength selection sections. On the other hand, as shown in FIGS. 8A and 8B, in the case of film formation based on partial overlapping, it is possible to remove the effect caused by the "film sagging in the thickness direction" at the ends of the respective wavelength selection sections, and consequently the positional accuracy of the ends can be absorbed.

As described above, with the liquid crystal display apparatus 10 according to the first embodiment of the present invention, respective color laser light components, which having been obtained with less absorption loss by wavelength separation in the wavelength selection substrate 23, enter the color filter array 24 as they are. Accordingly, it is possible to simply configure a liquid crystal display apparatus which is capable of achieving uniform brightness and high light utilization efficiency regardless of fluctuation in temperature without modifying the liquid crystal panel 22.

Second Embodiment

Figure 9A:
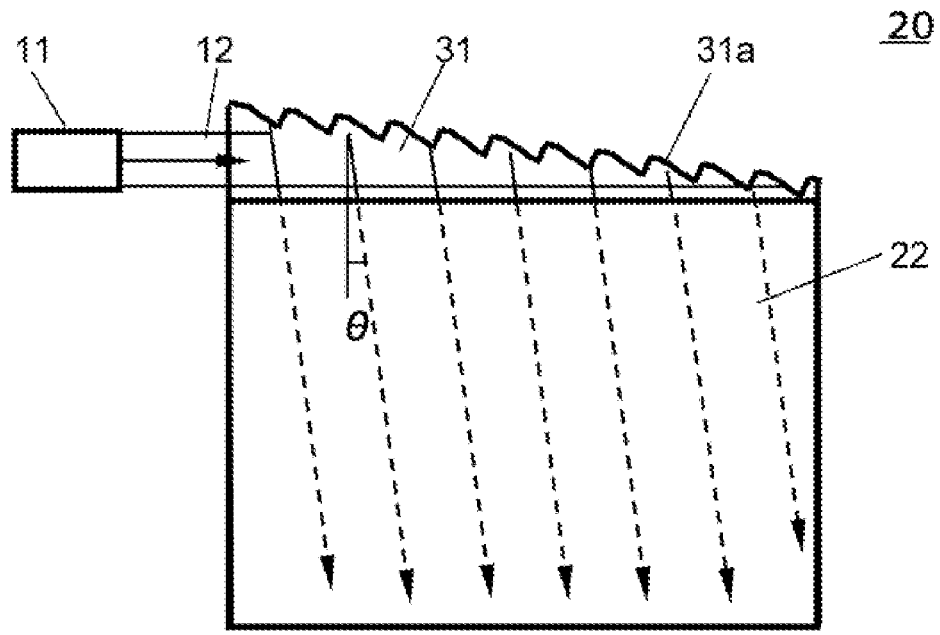
FIG. 9A is an arrow view illustrating a configuration of a liquid crystal display apparatus 20 according to a second embodiment of the present invention.
Figure 9B:
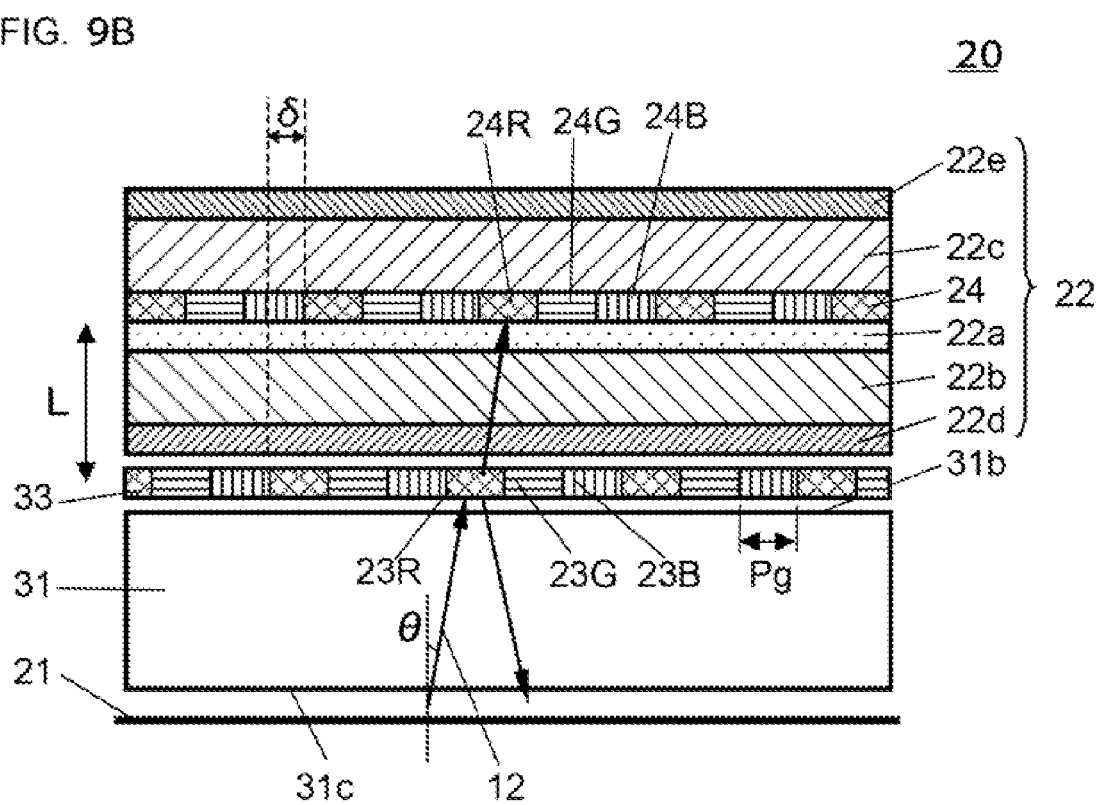
FIG. 9B is a cross-sectional view illustrating a configuration of the liquid crystal display apparatus 20 according to the second embodiment of the present invention.
Figure 9C:
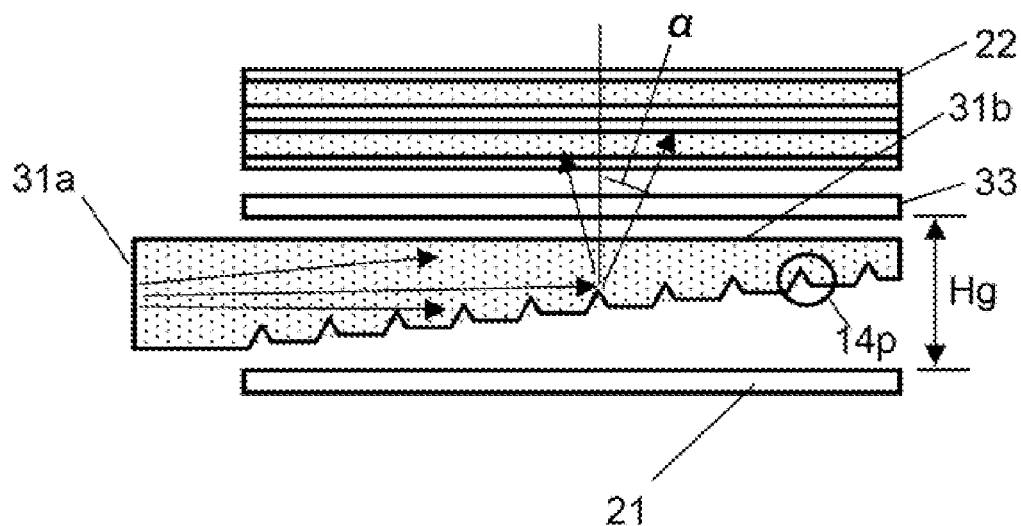
FIG. 9C is a cross-sectional view illustrating a configuration of the liquid crystal display apparatus 20 according to the second embodiment of the present invention.

FIGS. 9A and 9B are each a diagram illustrating a configuration of a liquid crystal display apparatus 20 according to a second embodiment of the present invention. FIG. 9A is an arrow view as viewed from the point A in FIG. 1; FIG. 9B is a vertical sectional view along the XZ plane cut along the B-B line in FIG. 1; and FIG. 9C is a vertical sectional view along the XY plane cut along the C-C line in FIG. 1. FIG. 9A illustrates the liquid crystal panel 22 in a transparent manner so that the laser light 12 (dotted arrows) propagating over the light guide plate 14 is viewed.

The liquid crystal display apparatus 20 according to the second embodiment is different from the liquid crystal display apparatus 10 according to the first embodiment in terms of a light guide plate 31 and a wavelength selection substrate 33, and the remaining components thereof are the same as those of the first embodiment. Hereinafter, the liquid crystal display apparatus 20 will be described in relation to the different components.

The structure of the light guide plate 31 is fundamentally the same as that of the light guide plate 14, but the tilt angle of triangular prisms on a first side surface 31a is slightly different. The laser light 12 emitted from the laser source unit 11 enters the light guide plate 31 from a second side surface 31d adjoining the first side surface 31a, hits sloping reflecting portions of the first side surface 31a, where the propagation direction of the laser light 12 is angled 90+θ degrees, and the laser light 12 turns into linear light (FIG. 9A). Therefore, from an upper surface 31b of the light guide plate 31, planar laser light 12 is outputted with an optical axis tilted at an angle θ relative to the XY plane (FIG. 9B).

In this manner, the planar laser light 12 having the optical axis tilted at the angle θ is outputted to the wavelength selection substrate 33. Accordingly, even when the laser light which has returned from the wavelength selection sections due to no color correspondence are reflected from the reflection plate 21, it is possible to prevent the reflected laser light from entering the same wavelength selection sections. Thus, a propagation distance of light in the light guide plate 31 can be shortened, and it is possible to minimize absorption or reflection loss of light in the light guide plate 31, and also possible to achieve high light utilization efficiency. Note that the angle θ is preferably 10 degrees or lower. With this angle, loss caused by rotation of polarization can be reduced to an ignorable level of about 1.5%.

In this case, the number of times of reflection N of a laser light component performed after entering a color filter until the laser light component enters the adjoining color filter is represented as the following formula, where used are: a pitch Pg of each of the wavelength selection sections 23R, 23G, and 23B in the arrangement direction; a distance Hg between the wavelength selection substrate 33 and the reflection plate 21; and a spread angle α, relative to the XY plane (the plane orthogonal to the arrangement direction of the wavelength selection sections 23R, 23G and 23B), of the laser light component outputted from the light guide plate 14 to the wavelength selection substrate 33 (FIGS. 9B and 9C).

$$N = Pg/(2 \times Hg \times \tan \alpha \times \sin \theta)$$

When the number of times of multiple reflections is lesser, a liquid crystal display apparatus having higher light utilization efficiency can be configured. For example, assuming that a laser light component is reflected between the wavelength selection substrate 33 and the reflection plate 21 five times or less, and then enters an adjoining color filter, if the pitch Pg is 100 μm, the distance Hg is 15 mm, and the angle α is 5 degrees, then the angle θ may be set to 0.45 degrees or greater. That is, it is preferable that the value of the angle θ satisfies the following formula.

$$\theta \geq \sin^{-1}(Pg/(10 \times Hg \times \tan \alpha))$$

Figure 9D:
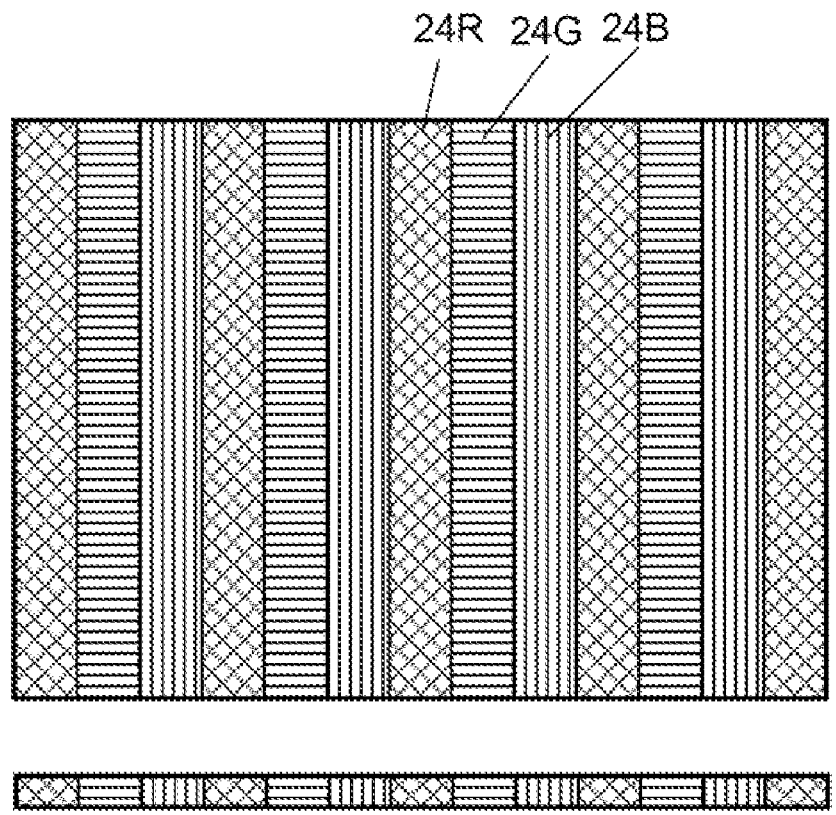
FIG. 9D is a diagram illustrating a structural example of a color filter array 24.

Further, as is clear from FIG. 9B, the laser light passing through the wavelength selection substrate 33 also enters the color filter array 24 at the angle θ. Accordingly, the positional relation between the wavelength selection substrate 33 and the color filter array 24 need be changed. Generally, the respective color filters 24R, 24G and 24B in the color filter array 24 are arranged such that respective colors form stripes, as shown in FIG. 9D. Thus, if the distance between the wavelength selection substrate 33 and the color filter array 24 is set as a distance L, the wavelength selection substrate 33 is arranged at a position obtained by displacing the wavelength selection substrate 23, of which respective colors correspond to those of the color filter array 24 in the vertical direction, by δ=L×tan θ. In this manner, if the wavelength selection substrate 33 is arranged by displacing its position by δ, it is possible to allow the laser light having passed through the wavelength selection substrate 33 to enter desired color filters.

As described above, with the liquid crystal display apparatus 20 according to the second embodiment of the present invention, in the same manner as that according to the first embodiment, it is possible to simply configure a liquid crystal display apparatus which is capable of achieving uniform brightness and high light utilization efficiency regardless of fluctuation in temperature without modifying the liquid crystal panel 22. As described in the first embodiment, the reflecting portions 25 may be included in the wavelength selection substrate 33 so as to remove effects caused by the black matrix 24M, the TFT, or the wiring 24T in the liquid crystal panel 22.

Third Embodiment

Figure 10A:
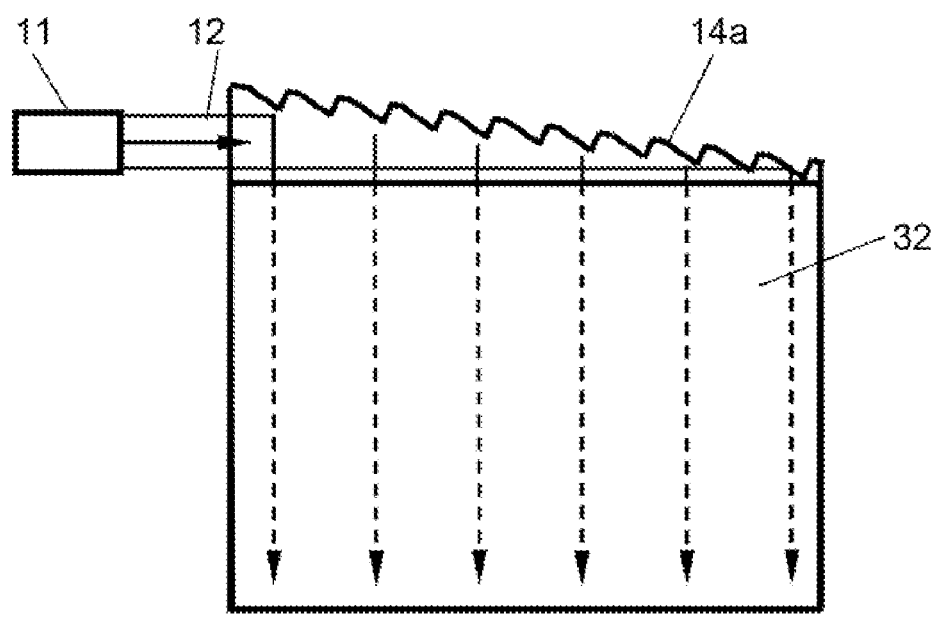
FIG. 10A is an arrow view illustrating a configuration of a liquid crystal display apparatus 30 according to a third embodiment of the present invention.
Figure 10B:
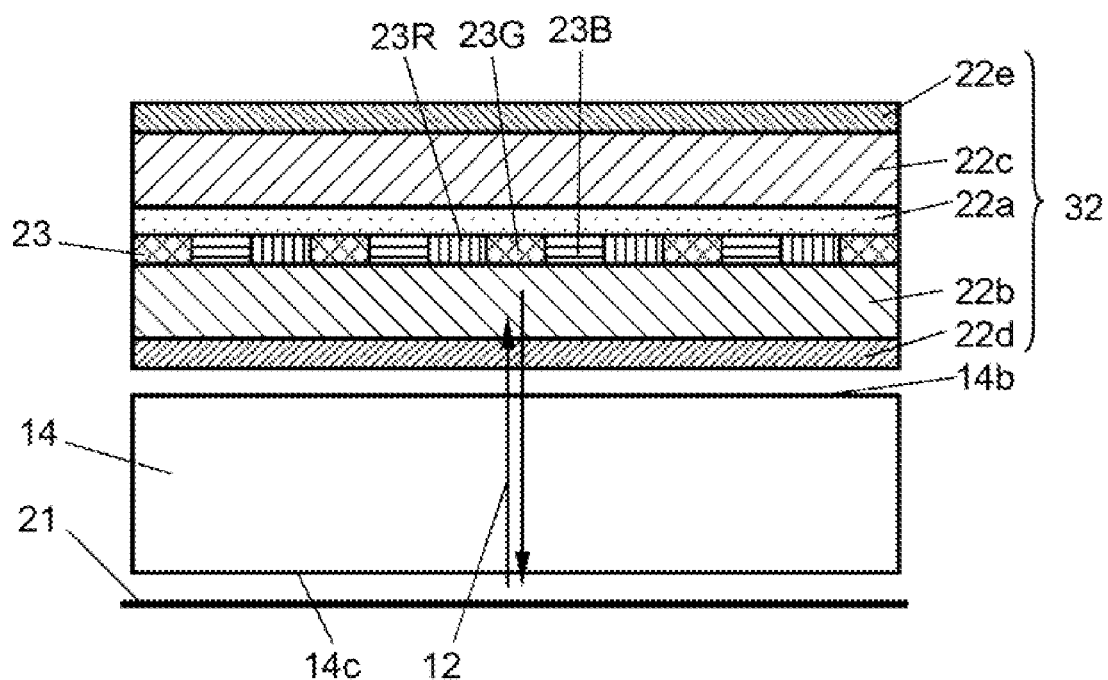
FIG. 10B is a cross-sectional view illustrating a configuration of the liquid crystal display apparatus 30 according to the third embodiment of the present invention.

FIGS. 10A and 10B is a diagram illustrating a configuration of a liquid crystal display apparatus 30 according to a third embodiment of the present invention. FIG. 10A is an arrow view as viewed from the point A in FIG. 1; and FIG. 10B is a vertical sectional view along the XZ plane cut along the B-B line in FIG. 1. FIG. 10A illustrates the liquid crystal panel 32 in a transparent manner so that the laser light 12 (dotted arrows) propagating over the light guide plate 14 is viewed.

The liquid crystal display apparatus 30 according to the third embodiment is different from the liquid crystal display apparatus 10 according to the first embodiment in terms of a wavelength selection substrate 23 and a liquid crystal panel 32, and the remaining components thereof are the same as those of the first embodiment. Hereinbelow, the liquid crystal display apparatus 30 will be described in relation to the different components.

The liquid crystal panel 32 includes the liquid crystal layer 22a, the wavelength selection substrate 23, the lower-side glass plate 22b, the upper-side glass plate 22c, the lower-side polarizing plate 22d, and the upper-side polarizing plate 22e. The liquid crystal panel 32 is configured such that the wavelength selection substrate 23, which is arranged outside the liquid crystal panel 22 in the liquid crystal display apparatus 10, is included in the liquid crystal panel 32. In addition, the liquid crystal layer 22a is located on the wavelength selection substrate 23.

Of the planar laser light 12 emitted from the upper surface 14b of the light guide plate 14, laser light components having a common polarization direction pass through the lower-side polarizing plate 22d and enter the wavelength selection substrate 23. The wavelength selection sections 23R, 23G, and 23B of the wavelength selection substrate 23 respectively transmit predetermined colors only, and respectively reflect colors other than the predetermined colors. The laser light components reflected due to no color correspondence again enter the light guide plate 14, and are reflected from the reflection plate 21, and then again enter the wavelength selection substrate 23 after passing through the light guide plate 14 and the lower-side polarizing plate 22d. These passing and reflection are performed repeatedly.

As described above, the liquid crystal display apparatus 30 according to the third embodiment of the present invention allows the respective color laser light components, which have been obtained with less absorption loss by wavelength separation in the wavelength selection substrate 23, to enter the liquid crystal layer 22a as they are. Accordingly, it is possible to simply configure a liquid crystal display apparatus which is capable of achieving uniform brightness and high light utilization efficiency regardless of fluctuation in temperature. Further, since a color filter array is eliminated by including the wavelength selection substrate 23 in the liquid crystal panel 32, and the arrangement of the liquid crystal layer 22a is devised carefully, low manufacturing costs as well as reduction in the optical absorption loss can be expected.

Figure 11A:
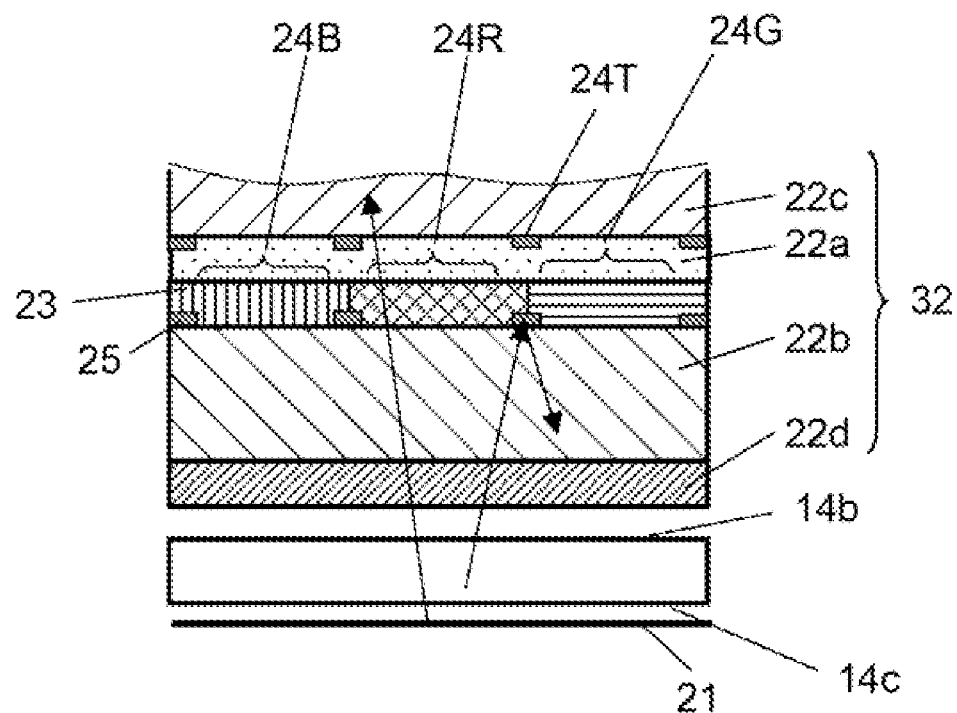
FIG. 11A is a diagram illustrating a structural example of the wavelength selection substrate 23.
Figure 11B:
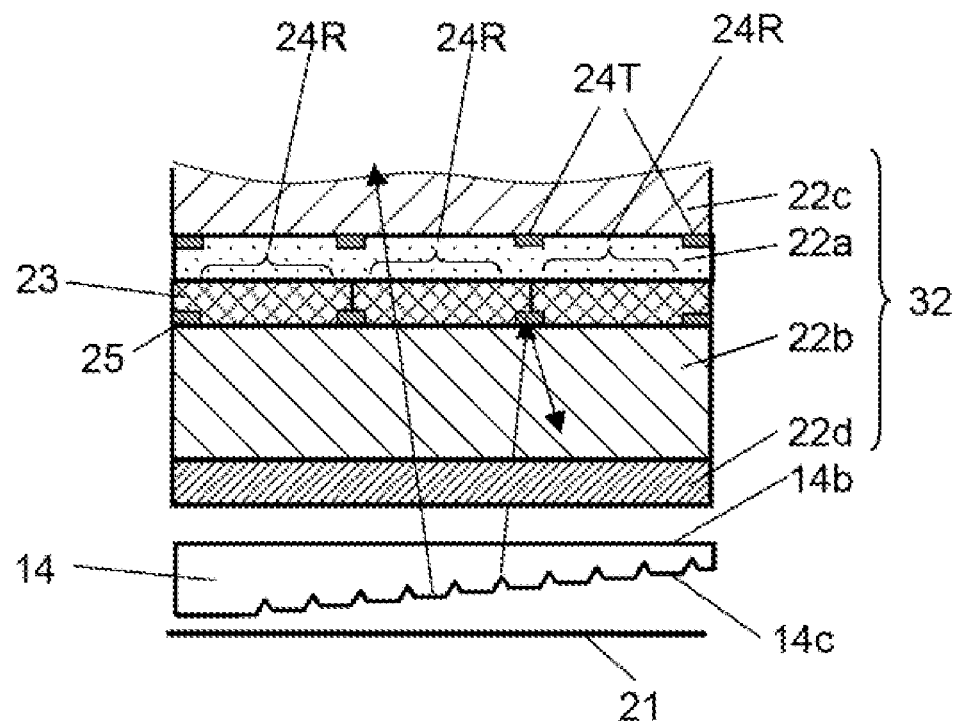
FIG. 11B is a diagram illustrating a structural example of the wavelength selection substrate 23.

Note that in the liquid crystal display apparatus 30, if the laser light 12 enters the light guide plate 14 at the spread angle φ (see FIG. 6A), the reflecting portions 25 is arranged to thereby reduce the optical absorption loss. Further, the reflecting portions 25 may be arranged in a manner as to be overlapped on boundaries of the wavelength selection sections. FIGS. 11A and 11B are each an example where the reflecting portions 25 are arranged inside the wavelength selection substrate 23 so as to reflect all wavelengths of the laser light 12. The width and length of each reflecting portion 25 may be set such that the dimensions of the reflecting portion 25 is the same as those of the TFT or the wiring 24T. Alternatively, when the laser light enters the wavelength selection substrate 23 at the angle θ (see FIG. 9A), the width and length of the reflecting portion 25 may be set in consideration of the angle θ.

Fourth Embodiment

Figure 12A:
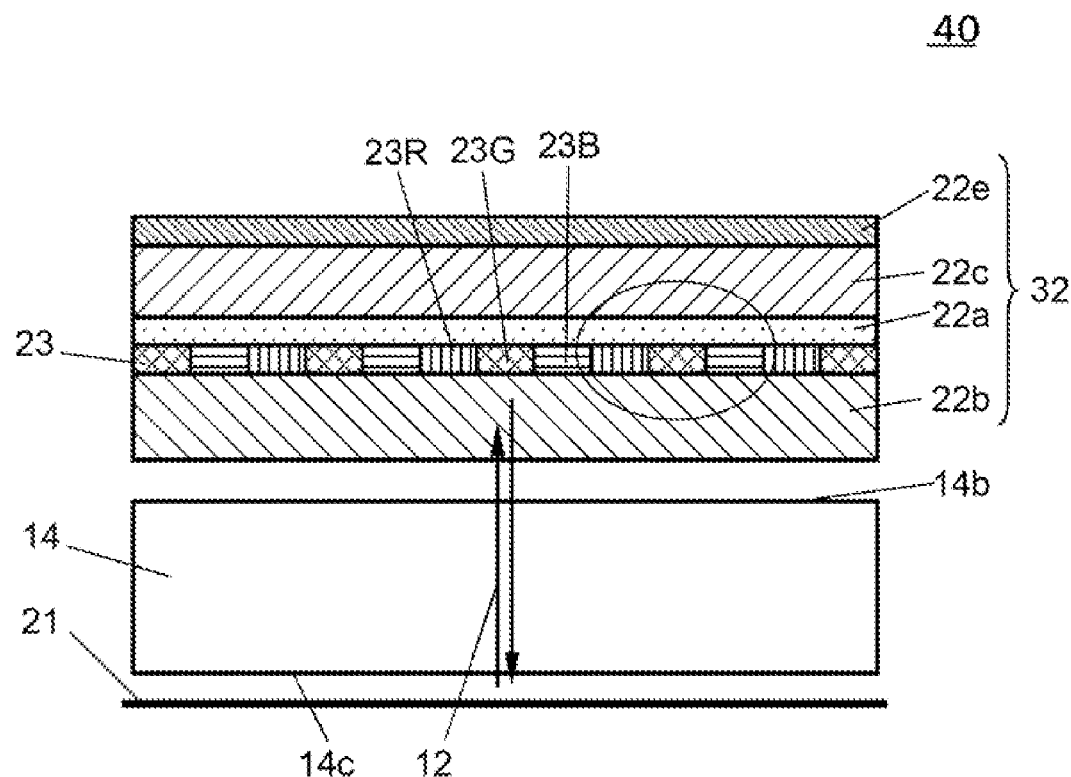
FIG. 12A is a cross-sectional view illustrating a configuration of a liquid crystal display apparatus 40 according to a fourth embodiment of the present invention.
Figure 12B:
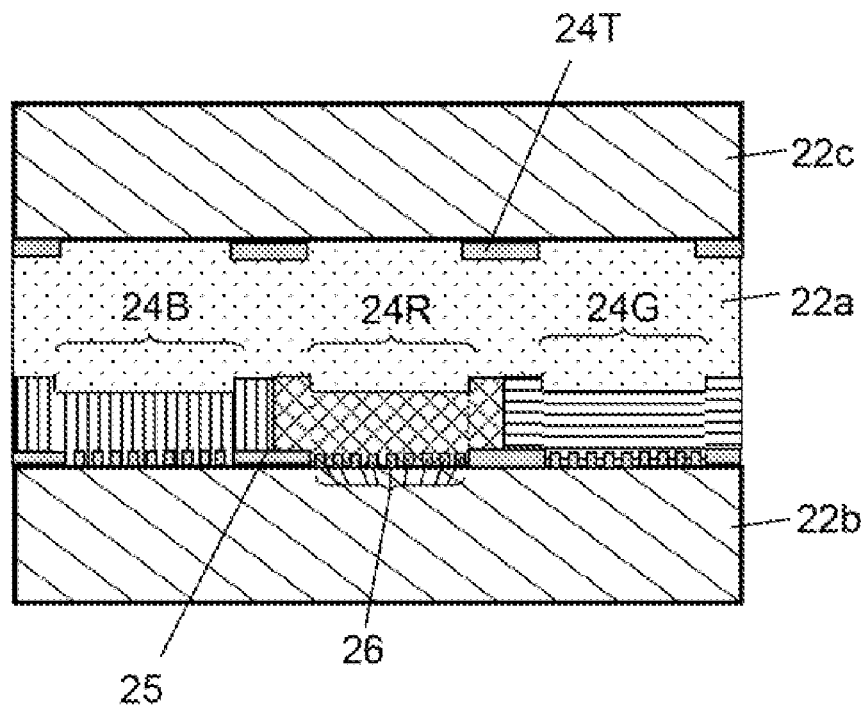
FIG. 12B is an enlarged cross-sectional view of a part of FIG. 12A.

FIGS. 12A and 12B are each a diagram illustrating a configuration of a liquid crystal display apparatus 40 according to a fourth embodiment of the present invention. FIG. 12A is a vertical sectional view along the XZ-plane cut along the B-B line in FIG. 1; and FIG. 12B is an enlarged view of a circled part of FIG. 12A.

The liquid crystal display apparatus 40 according to the fourth embodiment is different from the liquid crystal display apparatus 30 according to the third embodiment in that thin metal wires 26 are included in place of the lower-side polarizing plate 22d, and the remaining components thereof are the same as those of the third embodiment. Hereinbelow, the liquid crystal display apparatus 40 will be described in relation to the different components.

In the liquid crystal display apparatus 40, the thin metal wires 26 are arranged in a manner as to be interposed between the wavelength selection substrate 23 and the lower-side glass plate 22b. The thin metal wires function as a wire grid. In order to cause the thin metal wires to function as a wire grid, multiple aluminum wires, each having a width of 30 nm and a thickness of about 100 nm, for example, may be arranged at a pitch of about 150 nm in an arrangement direction of the wavelength selection sections for the respective colors (see FIG. 9D). In this arrangement, if the laser light, which enters the wavelength selection substrate 23 from the lower-side glass plate 22b, has a polarization in the arrangement direction (XZ plane) of the respective wavelength selection sections, the laser light passes through the thin metal wires, whereas if the laser light has a polarization in a direction (XY plane) orthogonal to the arrangement direction of the respective wavelength selection sections, the laser light is reflected from the thin metal wires.

Generally, the lower-side polarizing plate 22d used for the liquid crystal panel 32 is a polarizing plate utilizing dichroism of iodine or the like. However, the wire grid less absorbs light polarized in a transmission axis direction as compared to the lower-side polarizing plate. Thus, the light utilization efficiency is improved higher when the thin metal wires 26 are used than when the lower-side polarizing plate 22d is used. Note that when the reflecting portions 25 and the thin metal wires 26 are formed of a common material (e.g., aluminum), they can undergo a common process, leading to a significant cost reduction as compared to a case where the lower-side polarizing plate 22d is used.

Figure 12C:
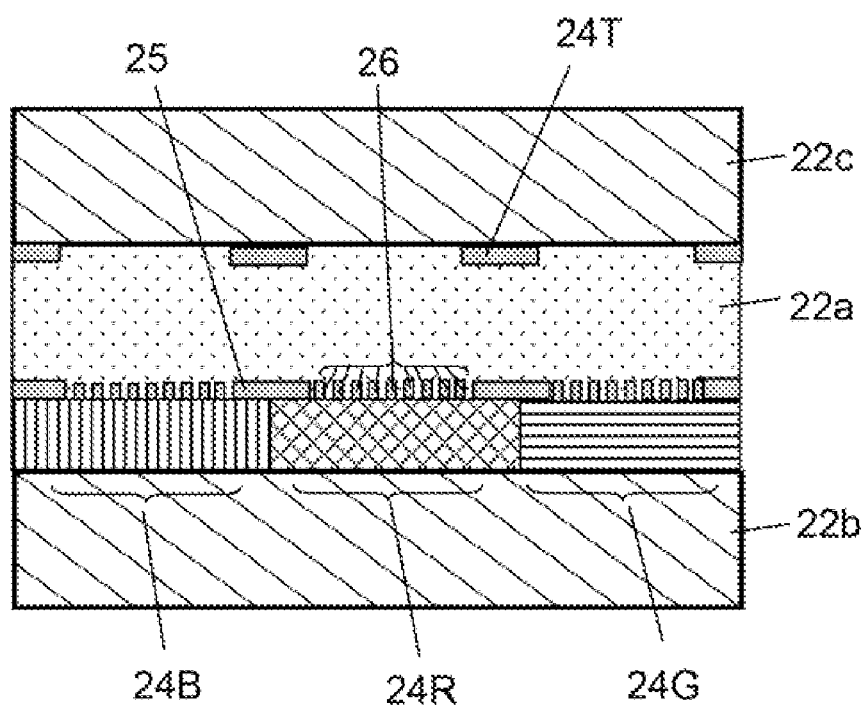
FIG. 12C is an enlarged cross-sectional view of a part of FIG. 12A.

These thin metal wires 26 may be arranged between the wavelength selection substrate 23 and the liquid crystal layer 22a (FIG. 12C). In this structure, a material which absorbs light is not arranged between the wavelength selection substrate 23 and the reflection plate 21, and thus, it is possible to eliminate absorption loss of laser light reflecting, in a reciprocating manner, between the wavelength selection substrate 23 and the reflection plate 21. Obviously, the polarization direction of the laser light 12 entering the liquid crystal layer 22a is maintained due to the thin metal wires 26.

As described above, the liquid crystal display apparatus 40 according to the fourth embodiment of the present invention allows the respective color laser light components, which have been obtained with less absorption loss by wavelength separation in the wavelength selection substrate 23, to enter the liquid crystal layer 22a as they are. Accordingly, it is possible to simply configure a liquid crystal display apparatus which is capable of achieving uniform brightness and high light utilization efficiency regardless of fluctuation in temperature.

Figure 13:
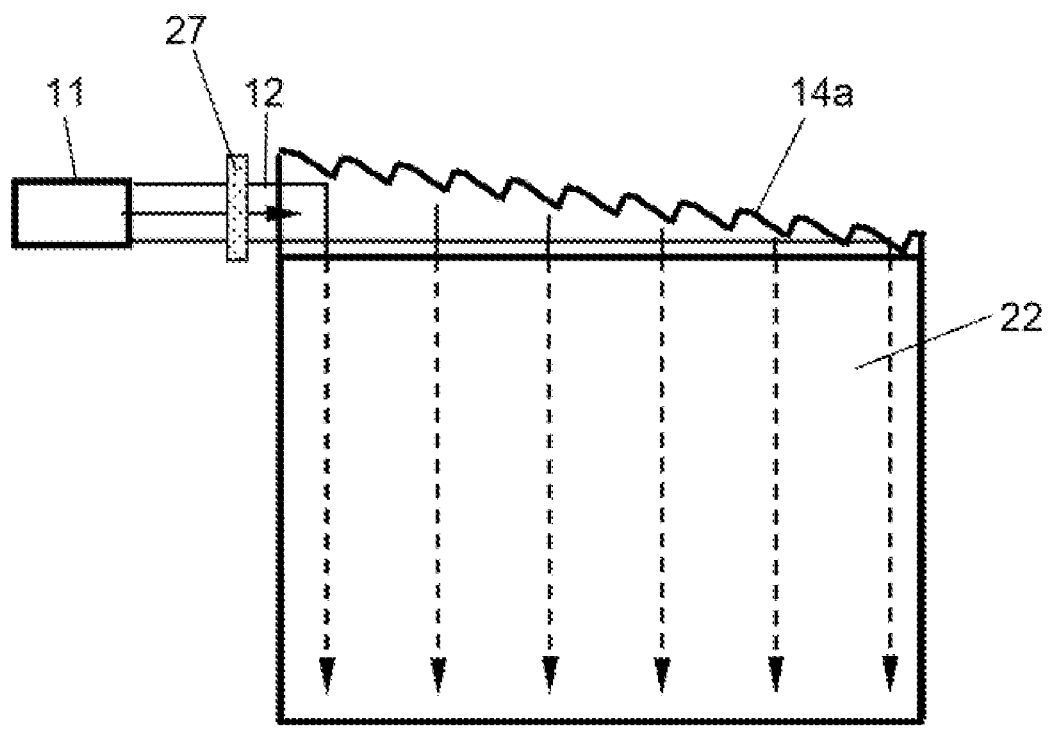
FIG. 13 is a diagram illustrating a configuration applicable to all the embodiments of the present invention.

Note that in the liquid crystal display apparatuses 10 to 40 according to the first to fourth embodiments, in order to set an extinction ratio of the laser light 12 at a predetermined level or more prior to entering the light guide plate 14 or 34, arrangement of polarizing plate 27 may be considered. FIG. 13 is an arrow view illustrating an example of a liquid crystal display apparatus including the polarizing plate 27, as viewed from the point A in FIG. 1. FIG. 13 illustrates the liquid crystal panel 22 in a transparent manner so that the laser light 12 (dotted arrows) propagating over the light guide plate 14 is viewed.

Generally, the laser light entering the liquid crystal layer 22a need have an extinction ratio of 3000:1 or greater. When the extinction ratio is lower than this, an image will have a low contrast, disadvantageously. When the lower-side polarizing plate 22d is a polarizing plate utilizing the dichroism of iodine or the like, and has an extinction ratio of about 3000:1, it is understood that the lower-side polarizing plate 22d absorbs the laser light polarized in the transmission axis direction by about 12%. Meanwhile, when a wire grid is used as the lower-side polarizing plate 22d, it is understood that the wire grid absorbs the laser light polarized in the transmission axis direction by about 10%. Accordingly, supposing that the laser light reciprocates between the wavelength selection substrate 23 and the reflection plate 21 five times, the intensity of the laser light absorbed by the polarizing plate utilizing the dichroism of iodine or the like is 70%, whereas that of the laser light absorbed by the wire grid is 65% or more.

Thus, in the example shown in FIG. 13, a polarizing plate 27 is interposed between the laser source unit 11 and the light guide plate 14, whereby the degree of polarization is increased. For example, when the polarizing plate 27 having an extinction ratio of about 100:1 and the lower-side polarizing plate 22d having an extinction ratio of about 30:1 are used, the laser light entering the liquid crystal layer 22a will have an extinction ratio of 3000:1. Instead of using the polarizing plate 27, the laser light 12 polarized with an extinction ratio of 100:1 or greater may be emitted from the laser source unit 11.

Fifth Embodiment

Figure 14A:
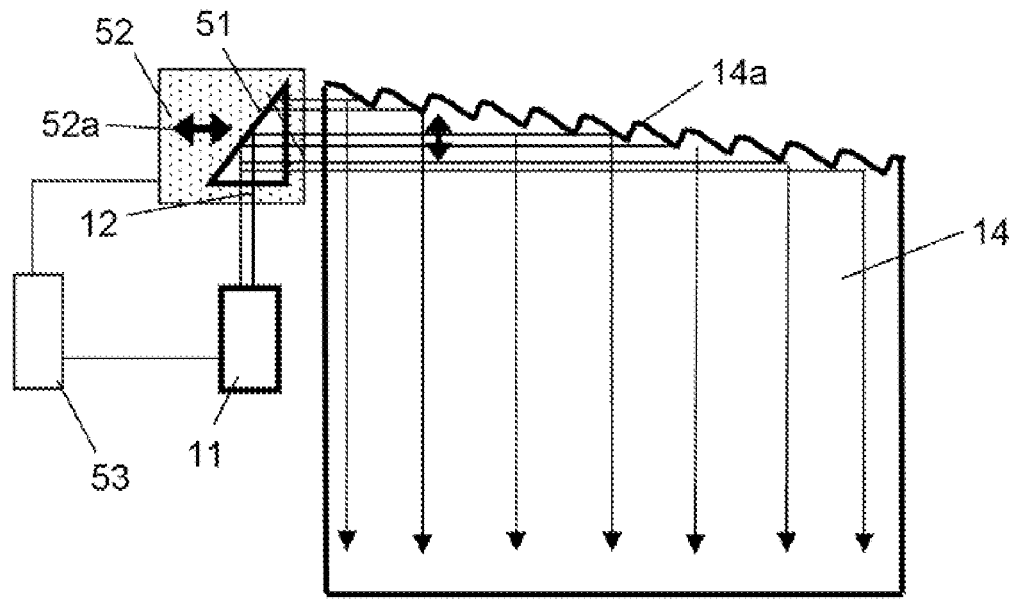
FIG. 14A is a diagram illustrating a configuration of a liquid crystal display apparatus 50 according to a fifth embodiment of the present invention.

FIG. 14A is a diagram illustrating a configuration of a liquid crystal display apparatus 50 according to a fifth embodiment of the present invention. FIG. 14A is an arrow view as viewed from the point A in FIG. 1. FIG. 14A is an arrow view illustrating a configuration in which the reflection plate 21, the wavelength selection substrate 23, and the liquid crystal panel 22 are omitted.

The liquid crystal display apparatus 50 according to the fifth embodiment is different from the liquid crystal display apparatuses 10 to 40 according to the first to fourth embodiments in that the liquid crystal display apparatus 50 further includes a vibrating section including a triangular prism 51, an actuator 52, and a control unit 53. The remaining components are the same as those of the first to fourth embodiments.

Hereinbelow, the liquid crystal display apparatus 50 will be described in relation to the different components.

The laser light 12 emitted from the laser source unit 11 is turned by the triangular prism 51, the propagation direction thereof changes by 90 degrees, and then the laser light 12 enters the light guide plate 14 from the second side surface 14d. The actuator 52 causes the triangular prism 51 to vibrate in the widthwise direction of the light guide plate 14 (horizontal movement), and scans the laser light 12 entering the light guide plate 14 one-dimensionally. By scanning the laser light 12 entering the light guide plate 14 in this manner, the brightness of the liquid crystal panel 22 or 32 can be maintained uniformly even if the profile of the laser light 12 fluctuates. This effect will be described specifically below.

Figure 14B:
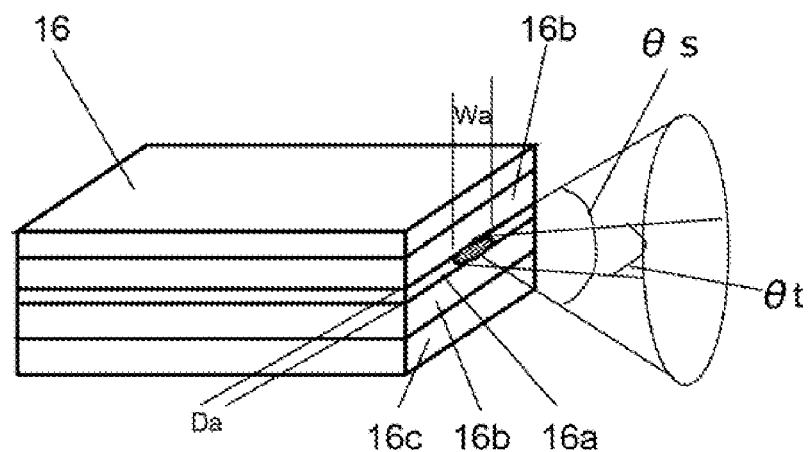
FIG. 14B is a schematic configuration diagram of a semiconductor laser 16 having high output power.
Figure 15A:
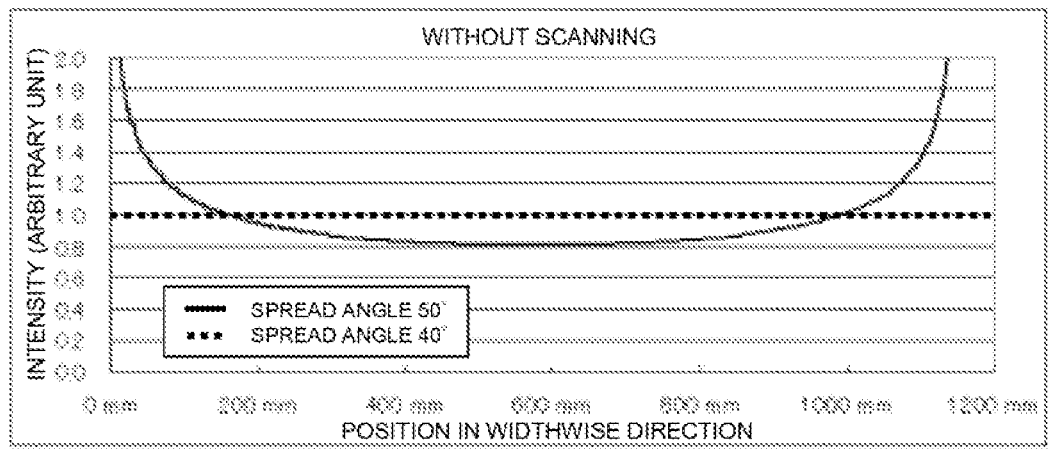
FIG. 15A is a diagram illustrating a result of measurement of the relation between a spread angle of laser light and brightness intensity distribution on the light guide plate 14.
Figure 15B:
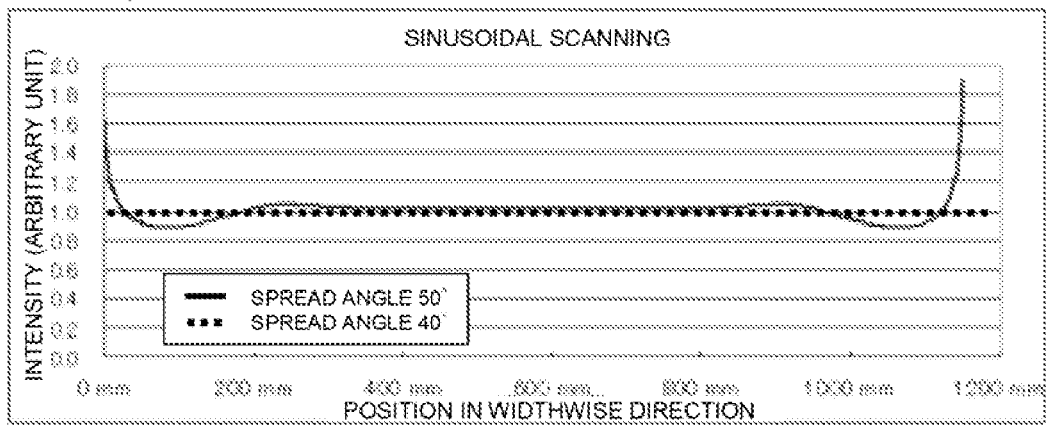
FIG. 15B is a diagram illustrating a result of measurement of the relation between the spread angle of laser light and the brightness intensity distribution on the light guide plate 14.
Figure 15C:
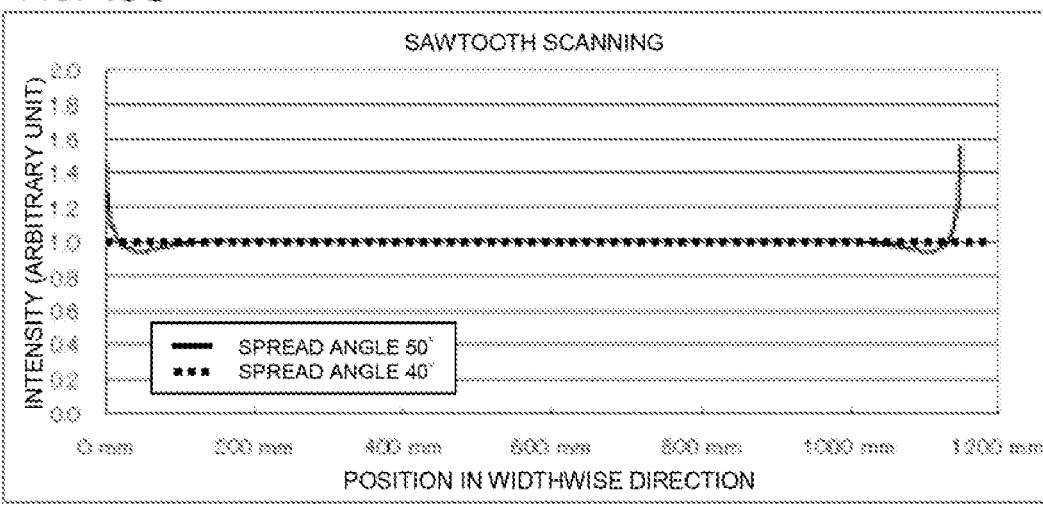
FIG. 15C is a diagram illustrating a result of measurement of the relation between the spread angle of laser light and the brightness intensity distribution on the light guide plate 14.

Generally, in view of individual difference, fluctuation in temperature, and fluctuation with time, the spread angle θs of light, in a vertical direction, from a semiconductor laser 16 varies in a range of about 30 to 50 degrees, and the spread angle θt in a horizon direction varies in a range of about 5 to 20 degrees (FIG. 14B). FIGS. 15A to 15C are each a diagram illustrating, for verification of effects of such variation, the intensity of laser light having a spread angle of 50 degrees when the laser light is emitted to a light guide plate which is designed to have a uniform brightness when laser light having a spread angle θt of 40 degrees in the horizon direction is emitted thereto.

When the laser light 12 emitted from the laser source unit 11 is not scanned, the brightness at the central part of the light guide plate decreases and causes unevenness, as shown in FIG. 15A. On the other hand, when the laser light 12 emitted from the laser source unit 11 is scanned, a significant difference in the brightness will not occur over the entirety of the light guide plate, and consequently no unevenness is visible, as shown in FIGS. 15B and 15C. Note that FIG. 15B indicates data of a case where the laser light is scanned in a sinusoidal waveform, and FIG. 15C indicates data of a case where the laser light is scanned in a sawtooth form.

As long as the laser light 12 can be scanned, a configuration employing a polygon mirror and an fθ lens, for example, may be applicable, instead of the above-described configuration employing the triangular prism 51 and the actuator 52.

In addition, it may be considered to change the quantity of light of the laser light 12 in synchronization with the scanning. For example, a part, on the upper surface 14b of the light guide plate 14, having uneven brightness, and a required quantity of light are obtained in advance, are associated with the position of the actuator 52, and are stored in the control unit 53. Accordingly, the control unit 53 optimally adjusts the quantity of light of the laser light 12 emitted from the laser source unit 11 in accordance with the stored information and the position of the actuator 52.

Figure 14C:
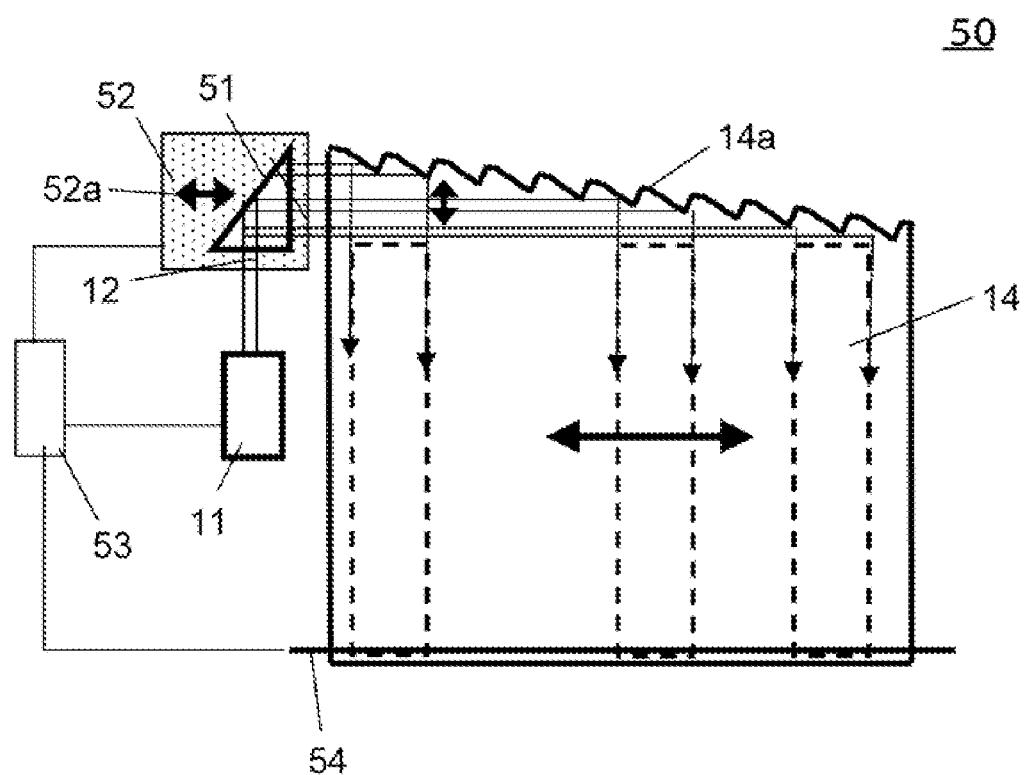
FIG. 14C is a diagram illustrating a configuration of the liquid crystal display apparatus 50 according to the fifth embodiment of the present invention.

Further, a case will be considered where a sensor array 54 for detecting the quantity of light is used. For example, as shown in FIG. 14C, the sensor array 54 is added to the configuration shown in FIG. 14A in a manner as to be arranged in the light guide plate 14, and thereby the sensor array 54 is connected to the control unit 53 for feedback of information detected by the sensor array 54. Accordingly, information on a part having uneven brightness and on the required quantity of light in the initial state is provided by the sensor array 54 to the control unit 53, and the quantity of light of the laser light 12 emitted from the laser source unit 11 can be adjusted (e.g., the laser light is caused to propagate only in a partial area (dotted rectangular area in FIG. 14C) of the light guide plate 14). Thus, it is possible to correct variation in brightness. In the case of using the three primary color laser source, the sensor array 54 detects information of the respective colors, whereby it is possible to correct variation in color in addition to the variation in brightness.

Further, a case may be considered where the quantity of light of the laser light is controlled in accordance with contrasting of respective colors of image data inputted to the liquid crystal panel 22 or 32. For example, image data inputted to the liquid crystal panel 22 or 32 is provided to the control unit 53. Accordingly, the contrasting can be controlled such that the quantity of light of the laser light 12 is decreased at the time of its scanning at a dark portion in the image data, and the quantity of light is increased at the time of its scanning at a bright portion in the image data. Therefore, it is possible to control the quantity of light on a portion-by-portion basis with the use of a single light source, thereby contributing to improvement in contrasting and power consumption saving. Particularly, when a transverse mode (widthwise direction of the light guide plate 14) of the laser light 12 emitted from the laser source unit 11 is a single mode, the laser light 12 can be caused to propagate substantially in parallel with the widthwise direction. Thus, the quantity of light can be controlled even for a smaller area in the image data.

Note that when a high power semiconductor laser of a W class is used for the laser source unit 11, an emitting diameter of laser light will be several μm or more. Thus, it is preferable to have a configuration as follows. FIG. 14B illustrates a structure of a typical high-power semiconductor laser 16. The semiconductor laser 16 has a configuration in which an active layer 16a interposed between cladding layers 16b are mounted on the substrate 16c. The refractive index of the active layer 16a is set greater than the refractive index of the cladding layers 16b. In the semiconductor laser 16, in order to set the power density of emitting laser light at a predetermined level or lower, a width Wa of the active layer is set to several tens to several hundreds of μm, and a thickness Da of the active layer is set to about five μm. Thus, the semiconductor laser 16 oscillates in a multi transverse mode in the widthwise direction, and oscillates in a single transverse mode in the thickness direction. Accordingly, the semiconductor laser 16 can be treated as a point light source with respect to the thickness direction. Therefore, it is desirable that the laser source unit 11 is arranged such that the widthwise direction of the light guide plate 14 correspond to the thickness direction of the semiconductor laser 16.

Figure 16:
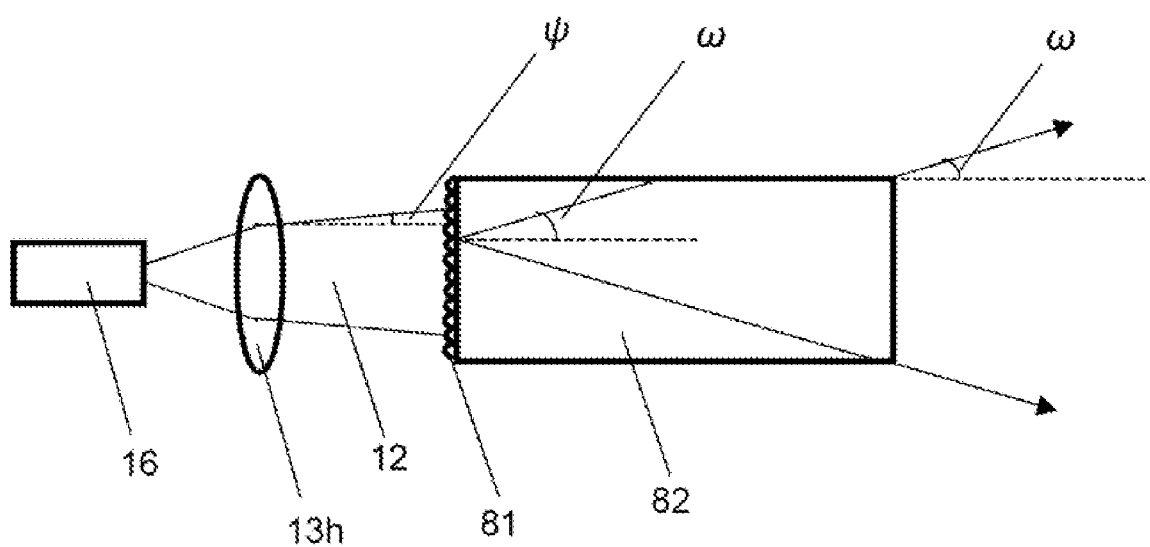
FIG. 16 is a diagram illustrating a configurational example where laser light 12 emitted from a semiconductor laser 16 enters a triangular prism 51.

Further, description has been made on the method of absorbing a fluctuation in the profile of laser light with respect to the widthwise direction of the light guide plate 14. On the other hand, a configuration described below can absorb the fluctuation in the profile of laser light with respect to the thickness direction of the light guide plate 14. For example, suppose a case of using as a light source the semiconductor laser 16 having a multi transverse mode in the thickness direction of the light guide plate 14. FIG. 16 is a diagram illustrating a configurational example where the laser light 12 emitted from the semiconductor laser 16 enters the triangular prism 51.

In FIG. 16, the laser light 12 emitted from the semiconductor laser 16 does not travel in parallel with each other after passing through the collimator lens 13h, but propagates while having a spread angle ψ. Thus, a rod integrator 82 is arranged which is designed to receive all the laser light 12 from the semiconductor laser 16. At a front end of the rod integrator 82, arranged is a lenticular lens 81 having optical power in the thickness direction of the light guide plate 14. The optical power of the lenticular lens 18 has a function of spreading the angle of the laser light 12 to an angle ω, which is significantly larger than the angle ψ, relative to parallel beams. Accordingly, the laser light 12 to be outputted from the rod integrator 82 is spread by the lenticular lens 81, and combined in the rod integrator 82. Consequently, the laser light 12 uniformly distributes at an inner side of an outputting end of the rod integrator 82, and in addition, since the spread angle ω is significantly larger than the angle ψ, the spread angle of the laser light 12 is substantially the angle ω. Thus, even if the spread angle of the laser light 12 fluctuates, an output angle of the laser light 12 from the rod integrator 82 hardly fluctuates. Moreover, even if the quantity of light of the laser light 12 outputted from the semiconductor laser 16 distributes unevenly, the laser light 12 is combined by the lenticular lens 81 and the rod integrator 82, and thus the quantity of light distributes uniformly at the inner side of the surface at the outputting end of the rod integrator 82.

As described above, in the liquid crystal display apparatus 50 according to the fifth embodiment of the present invention, the laser light 12 entering the light guide plate 14 is scanned one-dimensionally, and thus the brightness of the liquid crystal panel 22 or 32 can be maintained uniformly even if the profile of the laser light 12 fluctuates.

Note that the effect described in this embodiment can be also attained when a method of using the vibrating section described in this embodiment, which includes the triangular prism 51, the actuator 52, the control unit 53, and the sensor array 54, so as to achieve a uniform brightness by scanning of the laser light 12, or a method of changing the quantity of light of the laser light 12 based on synchronization with the scanning, based on measurement data on the sensor array 54, or based on image data inputted to the liquid crystal panel 22 or 32 is applied to a configuration other than the configuration, described in the first to fourth embodiments, which employs the light guide plate 14, the reflection plate 21, and the liquid crystal panels 22 and 32.

Sixth Embodiment

Figure 17A:
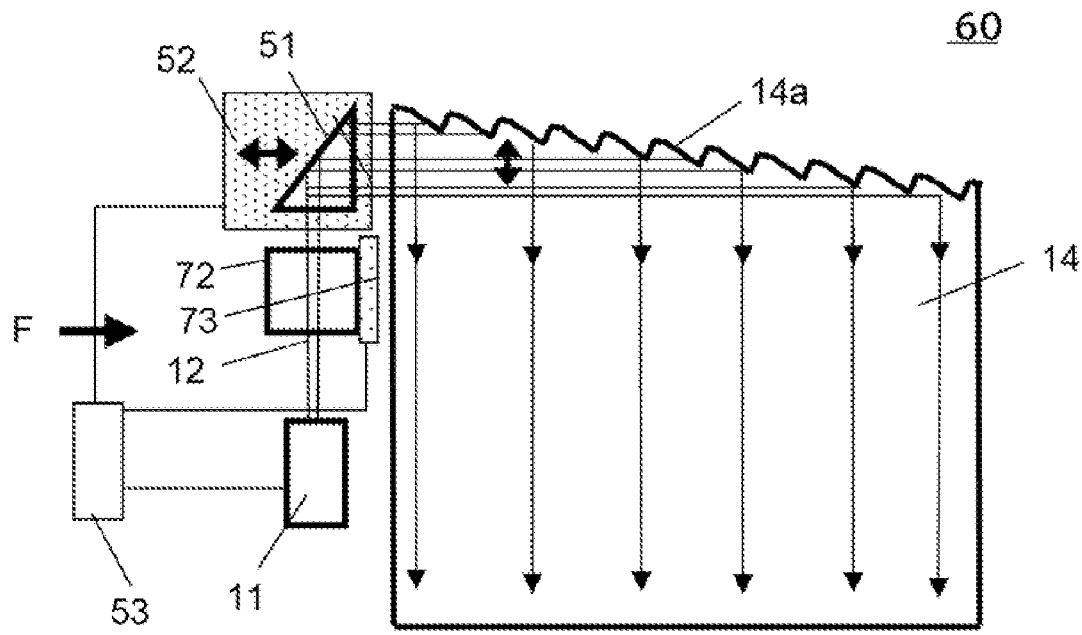
FIG. 17A is a diagram illustrating a configuration of a liquid crystal display apparatus 60 according to a sixth embodiment of the present invention.
Figure 17B:
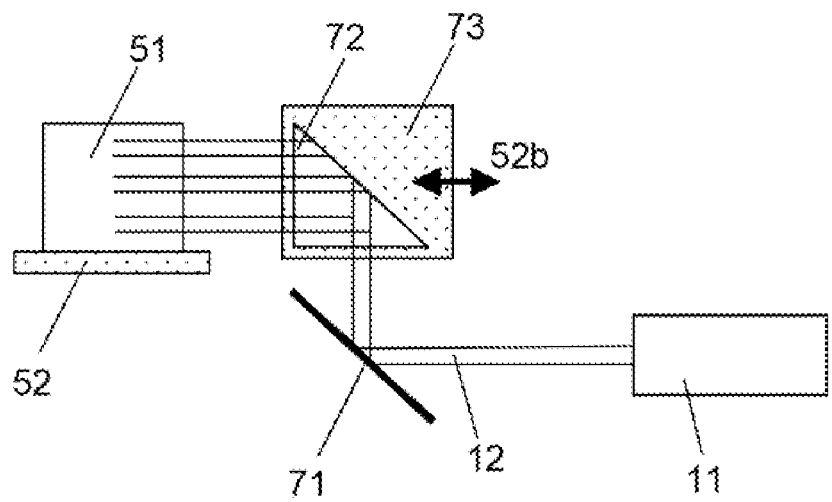
FIG. 17B is a diagram illustrating a configuration of the liquid crystal display apparatus 60 according to the sixth embodiment of the present invention.

FIGS. 17A and 17B are each a diagram illustrating a configuration of a liquid crystal display apparatus 60 according to a sixth embodiment of the present invention. FIG. 17A is an arrow view as viewed from the point A in FIG. 1; and FIG. 17B is an arrow view as viewed from a point F in FIG. 17A. FIG. 17A illustrates an arrow view of a configuration in which the reflection plate 21, the wavelength selection substrate 23, and the liquid crystal panel 22 are omitted.

The liquid crystal display apparatus 60 according to the sixth embodiment is different from the liquid crystal display apparatus 50 according to the fifth embodiment in that the vibrating section further includes a reflection mirror 71, a triangular prism 72, an actuator 73, and the remaining components are the same as those of the fifth embodiment. Hereinbelow, the liquid crystal display apparatus 60 will be described in relation to the different components.

The propagation direction of the laser light 12 emitted from the laser source unit 11 is angled 90 degrees by the reflection mirror 71, and the laser light 12 travels in the thickness direction of the light guide plate 14. The propagation direction of the laser light 12 is further angled 90 degrees by the triangular prism 72, and the laser light 12 travels in the widthwise direction of the light guide plate 14. The laser light 12 enters the triangular prism 51. The actuator 73 causes the triangular prism 72 to vibrate in a direction orthogonal to the actuator 52 (horizon movement). The actuator 52 causes the triangular prism 51 to vibrate in the widthwise direction of the light guide plate 14 (horizon movement). With these two vibrations, that is, vibration in the thickness direction of the light guide plate 14 by the actuator 73, and vibration in the widthwise direction of the light guide plate 14 by the actuator 52, the laser light 12 entering the light guide plate 14 can be consequently scanned two-dimensionally.

As described above, in the liquid crystal display apparatus 60 according to the sixth embodiment of the present invention, the laser light 12 entering the light guide plate 14 is scanned two-dimensionally, and thus the brightness of the liquid crystal panel 22 or 32 can be maintained uniformly even if the profile of the laser light 12 fluctuates.

Figure 17C:
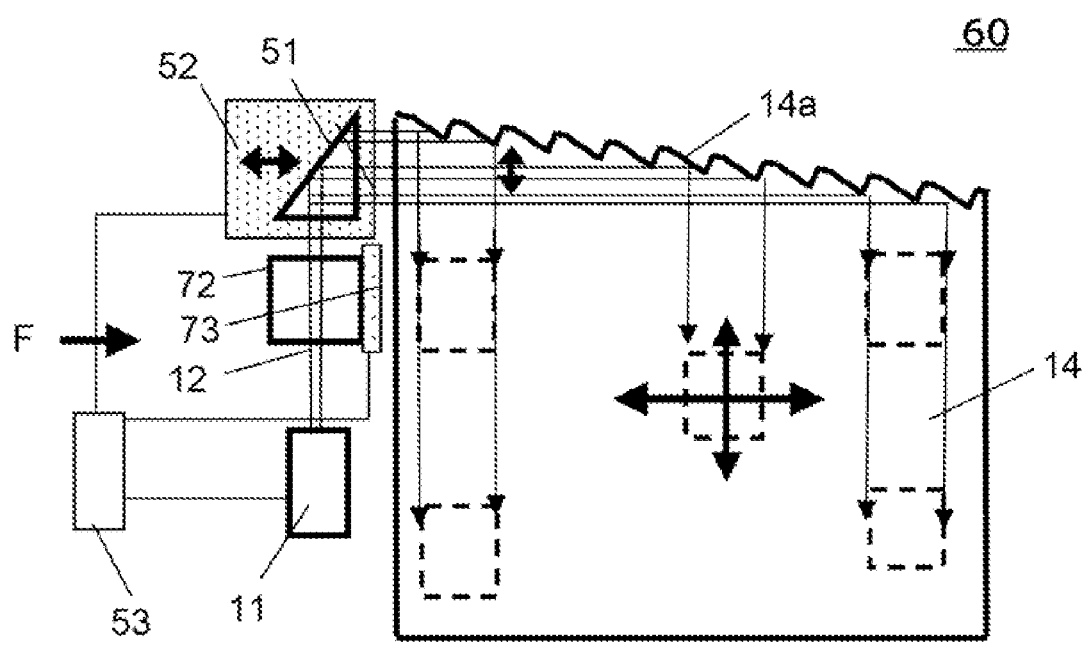
FIG. 17C is a diagram illustrating a configuration of the liquid crystal display apparatus 60 according to the sixth embodiment of the present invention.

Note that the effect of this embodiment can be also attained when a method of using the vibrating section described in this sixth embodiment which includes the triangular prism 51, the actuator 52, the control unit 53, the sensor array 54, the reflection mirror 71, the triangular prism 72, and the actuator 73 so as to achieve a uniform brightness by scanning of the laser light 12, or a method of changing the quantity of light of the laser light 12 (see FIG. 17C) based on synchronization with the scanning, based on measurement data on the sensor array 54; or based on image data inputted to the liquid crystal panel 22 or 32 is applied to a configuration other than the configuration described in the first to fourth embodiments which includes the light guide plate 14, the reflection plate 21, and the liquid crystal panels 22 and 32.

Seventh Embodiment

Figure 18A:
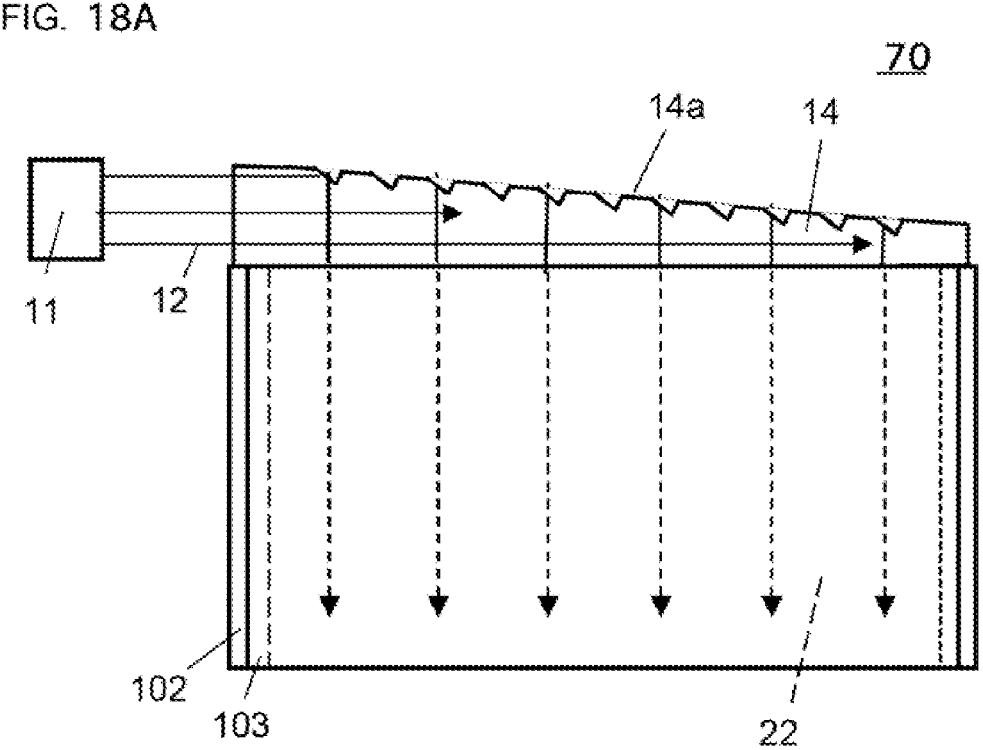
FIG. 18A is a diagram illustrating a configuration of a liquid crystal display apparatus 70 according to a seventh embodiment of the present invention.
Figure 18B:
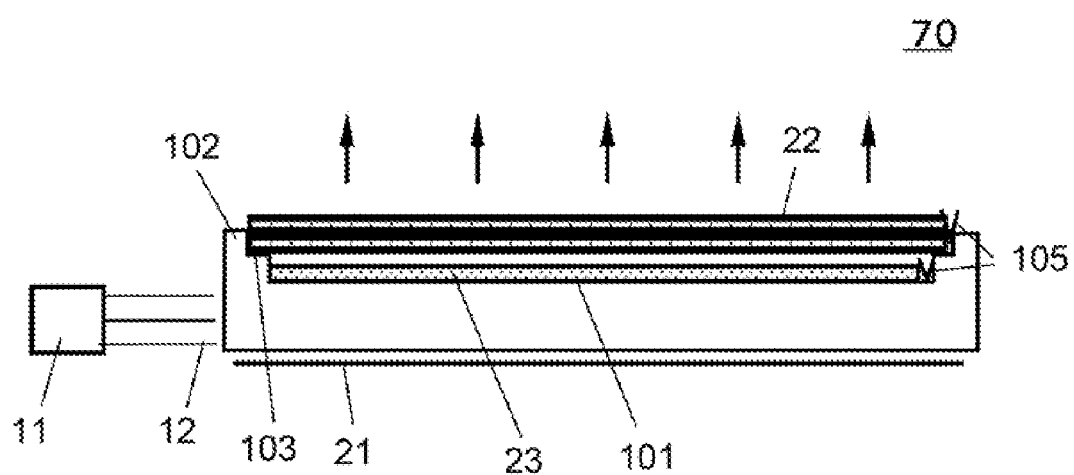
FIG. 18B is a diagram illustrating a configuration of the liquid crystal display apparatus 70 according to the seventh embodiment of the present invention.

FIGS. 18A and 18B are each a diagram illustrating a configuration of a liquid crystal display apparatus 70 according to a seventh embodiment of the present invention.

FIG. 18A is an arrow view as viewed from the point A in FIG. 1; and FIG. 18B is a vertical sectional view cut along the B-B line in FIG. 1. FIG. 18A illustrates the liquid crystal panel 22 in a transparent manner so that the laser light 12 (dotted arrows) propagating over the light guide plate 14 is viewed.

The liquid crystal display apparatus 70 according to the seventh embodiment provides a structure for fixing the wavelength selection substrate 23 and the liquid crystal panel 22 to the light guide plate 14, and the structure being applicable to the liquid crystal display apparatuses 10 to 60 according to the first to sixth embodiments.

On the upper surface 14b of the light guide plate 14, provided is a recessed portion 101 for accommodating the wavelength selection substrate 23. Ribs 102 are built so as to surround two sides or four sides of the recessed portion 101, and each rib 102 has a step 103 on its inner side so as to allow the liquid crystal panel 22 to be mounted on the wavelength selection substrate 23.

To manufacture the liquid crystal display apparatus 70, firstly, the wavelength selection substrate 23 is fitted into the recessed portion 101 such that the wavelength selection substrate 23 abuts against the ribs 102 on two sides. If there is a gap between the wavelength selection substrate 23 and the rib 102, a blade spring 105, for example, is interposed therebetween so as to fix the wavelength selection substrate 23. Next, the liquid crystal panel 22 is placed on the step 103 such that the liquid crystal panel 22 abuts against the ribs 102 on two sides. If there is a gap between the liquid crystal panel 22 and the rib 102, the blade spring 105 is interposed therebetween, for example, so as to fix the liquid crystal panel 22. Note that, as the fixing method, various well-known techniques can be utilized in addition to application of the blade spring 105.

As described above, the liquid crystal display apparatus 70 according to the seventh embodiment of the present invention enables easy positioning of the wavelength selection substrate 23 and the liquid crystal panel 22. In addition, since the ribs 102 function as reinforcement against bends or twists, they are effective for preventing uneven brightness in a large-scale liquid crystal television, for example, which particularly requires improvement in stiffness.

In the above respective embodiments, as an example of the laser source unit 11, a case has been described where the red laser source 11r, the green laser source 11g, and the blue laser source 11b are used. However, the laser source unit 11 is not limited to this. For example, when a Pr: fluoride laser, which is excited by a blue laser, is used as a light source, it is possible to generate light having a plurality of wavelengths using a single light source. In addition, a semiconductor laser configured by including a semiconductor laser having a plurality of wavelengths in a package may be used. In addition, a plurality of light sources is used for each color, and light therefrom may be combined. In this case, light from the plurality of light sources having a single transverse mode may be combined for each color.

INDUSTRIAL APPLICABILITY

The present invention is applicable to a liquid crystal display apparatus or the like which utilizes a laser source as a light source, and is useful for, for example, a case of achieving uniform brightness highly effectively and simply.

REFERENCE SIGNS LIST 10, 10, 30, 40, 50, 60, 70 liquid crystal display apparatus
11 laser source unit
11r, 11g, 11b light source
12, 12r, 12g, 12b laser light
12K, 12L dichroic mirror
13r, 13g, 13b collimator lens
14 light guide plate
14p erecting prism
14f, 14g curved surface
15a, 15b refractive index film
16 semiconductor laser
21 reflection plate
22, 32 liquid crystal panel
22a liquid crystal layer
22b, 22c glass plate
22d, 22e, 27 polarizing plate
23 wavelength selection substrate
23R, 23Q 23B wavelength selection section
23c grid pattern
23M mask
24 color filter array
24R, 24Q 24B color filter
24M black matrix
24T TFT and wiring
25 reflecting portion
26 thin metal wire
51, 72 triangular prism
52, 73 actuator
53 control unit
54 sensor array
71 reflection mirror
81 lenticular lens
82 rod integrator
101 recessed portion
102 rib
103 step
105 blade spring

The invention claimed is:

1. A liquid crystal display apparatus using a backlight employing an edge light method, the liquid crystal display apparatus comprising:
   a laser source unit which emits laser light having a plurality of different wavelengths;
   a light guide plate which receives the laser light from a side surface thereof, and outputs two-dimensional laser light having a predetermined spread angle from an upper surface thereof perpendicular to the side surface,
   a liquid crystal panel having thereinside color filters corresponding to the plurality of wavelengths;
   a wavelength selection substrate including wavelength selection sections which are arranged, for the respective wavelengths, between the liquid crystal panel and the upper surface of the light guide plate in a manner as to correspond to an arrangement of the color filters, and which each transmit, toward the liquid crystal panel, a predetermined wavelength of laser light outputted from the light guide plate and reflect, toward the light guide plate, laser light having wavelengths other than the predetermined wavelength, outputted from the light guide plate; and
   a reflector which is arranged on the side of a bottom surface, which opposes the upper surface of the light guide plate, and reflects laser light having been reflected from the wavelength selection substrate and passed through the light guide plate to thereby cause the laser light to re-enter the wavelength selection substrate through the light guide plate.

2. The liquid crystal display apparatus according to claim 1, wherein, in the wavelength selection substrate, a width and a length of each wavelength selection section are shorter than a width and a length of each color filter, and reflecting portions are arranged at boundaries between the wavelength selection sections adjoining one another, the reflecting portions each reflecting more than or equal to 50% of all wavelengths of laser light emitted from the laser source unit.

3. The liquid crystal display apparatus according to claim 2, wherein the reflecting portions are each formed of a metal thin film or a dielectric multilayer film.

4. The liquid crystal display apparatus according to claim 3, wherein the reflecting portions are each arranged in a manner as to partially overlap on adjoining two of the wavelength selection sections.

5. The liquid crystal display apparatus according to claim 1, wherein, in the wavelength selection substrate, the arrangement of the wavelength selection sections is displaced from the arrangement of the color filters in accordance with an angle θ that is formed between an axis perpendicular to an arrangement direction of the wavelength selection sections and an optical axis of principal laser light entering the wavelength selection sections, and with a distance between the color filters and the wavelength selection substrate.

6. The liquid crystal according to claim 1, wherein the angle θ is set to a value satisfying a formula below, where used are a pitch Pg in an arrangement direction of the wavelength selection sections, a distance Hg between the wavelength selection substrate and the reflector, and a spread angle α of laser light outputted from the light guide plate to the wavelength selection substrate, the spread angle α being relative to a plane orthogonal to the arrangement direction of the wavelength selection sections, $$10 \geq \theta \geq \sin^{-1}(Pg/(10 \times Hg \times \tan \alpha)).$$

7. The liquid crystal display apparatus according to claim 1, wherein the light guide plate outputs laser light having a predetermined spread angle at least either in a plane parallel with an arrangement direction of the wavelength selection sections or in a plane orthogonal to the arrangement direction.

8. The liquid crystal display apparatus according to claim 7, wherein
   the light guide plate has, on at least a part of the bottom surface, a reflecting portion which turns a traveling direction of laser light having entered from the side surface toward the direction of the upper surface, and
   in the reflecting portion, any of triangular prisms, trapezoidal prisms, and prisms having curved surfaces are formed in a sloped manner, and a range that is irradiated with the entering laser light in each prism is set to range from 1 μm to 20 μm in a direction parallel with the upper surface of the light guide plate.

9. The liquid crystal display apparatus according to claim 1, wherein the reflector is a total reflection prism arranged on the bottom surface of the light guide plate.

10. The liquid crystal display apparatus according to claim 1, further comprising
    a vibrating section which causes laser light emitted from the laser source unit to vibrate at least either in a widthwise direction or in a thickness direction of the light guide plate.

11. The liquid crystal display apparatus according to claim 10, wherein the vibrating section further includes a control section which adjusts a quantity of light of laser light emitted from the laser source unit, for a plurality of wavelengths thereof individually, in accordance with a brightness distribution in the light guide plate or image data to be displayed on the liquid crystal panel.

12. The liquid crystal display apparatus according to claim 11, wherein the control section includes first means which adjusts individually a quantity of light of laser light emitted from the laser source unit, depending on positions, in the light guide plate, where the laser light emitted from the laser source unit enters.

13. The liquid crystal display apparatus according to claim 12, wherein the control section includes second means which adjusts individually a quantity of light of laser light emitted from the laser source unit in accordance with a one-dimensional or two-dimensional brightness distribution of respective wavelengths of laser light outputted from the light guide plate when laser light having a predefined quantity of light is emitted from the laser source unit to the light guide plate.

14. The liquid crystal display apparatus according to claim 10, wherein the laser source unit generates laser light in a single transverse mode in a predetermined direction, and emits parallel light to the side surface of the light guide plate, the parallel light being obtained by converting the laser light so as to be substantially parallel with the predetermined direction.

15. The liquid crystal display apparatus according to claim 14, wherein the laser source unit includes a semiconductor laser source which generates laser light in a single transverse mode in a thickness direction of an active layer.

16. A liquid crystal display apparatus using a backlight employing an edge light method, the liquid crystal display apparatus comprising:
    a laser source unit which emits laser light having a plurality of different wavelengths;
    a light guide plate which receives the laser light from a side surface thereof, and outputs two-dimensional laser light having a predetermined spread angle from an upper surface thereof perpendicular to the side surface,
    a liquid crystal panel having thereinside a wavelength selection substrate including wavelength selection sections which are arranged, for the respective wavelengths, on the side of the upper surface of the light guide plate, and which each transmit a predetermined wavelength of laser light outputted from the light guide plate and reflect, toward the light guide plate, laser light having wavelengths other than the predetermined wavelength, outputted from the light guide plate; and a reflector which is arranged on the side of a bottom surface, which opposes the upper surface of the light guide plate, and reflects laser light having been reflected from the wavelength selection substrate and passed through the light guide plate to thereby cause the laser light to re-enter the wavelength selection substrate through the light guide plate.

17. The liquid crystal display apparatus according to claim 16, wherein reflecting portions are arranged at boundaries between the wavelength selection sections adjoining one another, the reflecting portions each reflecting more than or equal to 50% of all wavelengths of laser light emitted from the laser source unit.

18. The liquid crystal display apparatus according to claim 17, wherein the reflecting portions are each formed of a metal thin film or a dielectric multilayer film.

19. The liquid crystal display apparatus according to claim 18, wherein the reflecting portions are each arranged in a manner as to partially overlap on adjoining two of the wavelength selection sections.

20. The liquid crystal according to claim 16, wherein an angle θ that is formed between an axis perpendicular to an arrangement direction of the wavelength selection sections and an optical axis of principal laser light entering the wavelength selection sections is set to a value satisfying a formula below, where used are a pitch Pg in an arrangement direction of the wavelength selection sections, a distance Hg between the wavelength selection substrate and the reflector, and a spread angle α of laser light outputted from the light guide plate to the wavelength selection substrate, the spread angle α being relative to a plane orthogonal to the arrangement direction of the wavelength selection sections, $$10 \geq \theta \geq \sin^{-1}(Pg/(10 \times Hg \times \tan \alpha)).$$

21. The liquid crystal display apparatus according to claim 16, wherein the light guide plate outputs laser light having a predetermined spread angle at least either in a plane parallel with an arrangement direction of the wavelength selection sections or in a plane orthogonal to the arrangement direction.

22. The liquid crystal display apparatus according to claim 21, wherein the light guide plate has, on at least a part of the bottom surface, a reflecting portion which turns a traveling direction of laser light having entered from the side surface toward the direction of the upper surface, and in the reflecting portion, any of triangular prisms, trapezoidal prisms, and prisms having curved surfaces are formed in a sloped manner, and a range that is irradiated with the entering laser light in each prism is set to range from 1 μm to 20 μm in a direction parallel with the upper surface of the light guide plate.

23. The liquid crystal display apparatus according to claim 16, wherein the reflector is a total reflection prism arranged on the bottom surface of the light guide plate.

24. The liquid crystal display apparatus according to claim 16, further comprising a vibrating section which causes laser light emitted from the laser source unit to vibrate at least either in a widthwise direction or in a thickness direction of the light guide plate.

25. The liquid crystal display apparatus according to claim 24, wherein the vibrating section further includes a control section which adjusts a quantity of light of laser light emitted from the laser source unit, for a plurality of wavelengths thereof individually, in accordance with a brightness distribution in the light guide plate and image data to be displayed on the liquid crystal panel.

26. The liquid crystal display apparatus according to claim 25, wherein the control section includes first means which adjusts individually a quantity of light of laser light emitted from the laser source unit, depending on positions, in the light guide plate, where the laser light emitted from the laser source unit enters.

27. The liquid crystal display apparatus according to claim 26, wherein the control section includes second means which adjusts individually a quantity of light of laser light emitted from the laser source unit in accordance with a one-dimensional or two-dimensional brightness distribution of respective wavelengths of laser light outputted from the light guide plate when laser light having a predefined quantity of light is emitted from the laser source unit to the light guide plate.

28. The liquid crystal display apparatus according to claim 26, wherein the laser source unit generates laser light in a single transverse mode in a predetermined direction, and emits parallel light to the side surface of the light guide plate, the parallel light being obtained by converting the laser light so as to be substantially parallel with the predetermined direction.

29. The liquid crystal display apparatus according to claim 28, wherein the laser source unit includes a semiconductor laser source which generates laser light in a single transverse mode in a thickness direction of an active layer.

* * * * *